US005569071A

United States Patent [19]
Metier et al.

[11] Patent Number: 5,569,071
[45] Date of Patent: Oct. 29, 1996

[54] CRADLE AND METHOD FOR THE SLAUGHTERING OF RATITES, INCLUDING OSTRICH AND EMU

[75] Inventors: T. Thomas Metier, 1430 Winfield Dr., Fort Collins, Colo. 80526; Bobby R. Schumann, Elizabeth, Colo.

[73] Assignee: T. Thomas Metier, Fort Collins, Colo.

[21] Appl. No.: 420,384

[22] Filed: Apr. 11, 1995

Related U.S. Application Data

[63] Continuation-in-part of Ser. No. 86,221, Jul. 1, 1993, Pat. No. 5,405,289, which is a continuation-in-part of Ser. No. 713,467, Jun. 10, 1991, Pat. No. 5,246,396.

[51] Int. Cl.$^6$ ........................................ A22B 5/06
[52] U.S. Cl. ........................................ 452/185
[58] Field of Search ........................................ 452/185, 187, 452/188, 194, 125, 131, 96, 182, 183

[56] References Cited

U.S. PATENT DOCUMENTS

| | | | |
|---|---|---|---|
| 702,366 | 6/1902 | Johnson | 49/42 |
| 1,764,425 | 7/1930 | Thomas | 452/131 |
| 2,154,420 | 4/1939 | Crapo | 452/58 |
| 2,306,773 | 12/1942 | Biffinger | 452/58 |
| 2,441,499 | 5/1948 | Medlin | 452/58 |
| 2,793,393 | 5/1957 | Fosdick | 452/58 |
| 2,802,244 | 8/1957 | Parker | 49/42 |
| 2,846,718 | 8/1958 | Sengelaub et al. | 452/167 |
| 3,457,585 | 7/1969 | Edison | 452/54 |
| 3,743,122 | 7/1973 | Fortriede | 214/44 R |
| 3,828,681 | 8/1974 | Christensen et al. | 104/88 |
| 3,833,966 | 9/1974 | Harben, Jr. | 17/1 E |
| 3,911,530 | 10/1975 | Kalfsbeek et al. | 452/83 |
| 4,090,275 | 5/1978 | Jorgensen et al. | 452/182 |
| 4,092,761 | 6/1978 | McWhirter et al. | 452/58 |
| 4,097,960 | 7/1978 | Graham et al. | 17/11 |
| 4,118,830 | 10/1978 | Weiland | 452/131 |
| 4,220,094 | 9/1980 | Nielsen | 104/89 |
| 4,224,029 | 9/1980 | Heinz | 8/94.19 |

(List continued on next page.)

FOREIGN PATENT DOCUMENTS 93871 10/1962 Denmark ........................ 452/166

OTHER PUBLICATIONS

K. J. Benfield, "Poultry in Motion: Breeder's Sell Shares in Ostrich Market," Cover story of *The Wall Street Journal*, Summer 1990.

S. Lynn, "Rich Boas, Boots, and Golden Eggs," *Ultra Magazine*, Feb. 1991, pp. 69–70, 125.

*Primary Examiner*—Willis Little
*Attorney, Agent, or Firm*—Hopkins & Thomas; Scott A. Horstemeyer

[57] ABSTRACT

A method is disclosed for the humane slaughter and processing of ratites, including but not limited to, ostrich and emu, which are generally very large, heavy, and hostile animals, on a mass scale while preserving the quality of body parts during removal. The method envisions transporting the ratites from station to station within a facility via a rail system and cradle. The cradle is provided for holding the ratite during the processing of body parts and for permitting movement of the ratite through the various stations. The processing methodology of the preferred embodiment comprises the following steps. First, each ratite is rendered unconscious by an electrical discharge to the ratite body. The ratites are hung in an inverted position on the rail system. The ratites are then killed by lacerating the arteries in the neck and also the windpipe. The head of each ratite is removed and useful parts are extracted. Next, each ratite is de-feathered and skinned so that the hide is not damaged during removal. Specifically, the hide and muscle tissue of each ratite are separated by injecting air into the ratite at various locations. This loosens the feathers and hide. The loosened feathers are then removed from the hide of the ratite. The ratite is then placed on the cradle whereby the hide can be carefully removed from the ratite utilizing off-pattern cuts so that the most valuable portions of the hide are preserved. Finally, the viscera, gizzard, heart, liver, and edible meat products are removed from the ratite and are processed for human use.

11 Claims, 21 Drawing Sheets

U.S. PATENT DOCUMENTS

| | | | |
|---|---|---|---|
| 4,468,838 | 9/1984 | Sjöström et al. | 452/169 |
| 4,538,325 | 9/1985 | Harben, Jr. et al. | 452/111 |
| 4,557,020 | 12/1985 | Wenzel | 452/179 |
| 4,564,977 | 1/1986 | Scheier et al. | 452/109 |
| 4,748,719 | 6/1988 | Bowman et al. | 452/58 |
| 4,800,679 | 1/1989 | Appecmann | 49/42 |
| 4,829,635 | 5/1989 | Tonnies | 17/45 |
| 5,090,941 | 2/1992 | Dechow | 452/182 |
| 5,167,568 | 12/1992 | Esbroeck et al. | 452/122 |
| 5,259,810 | 11/1993 | Evers et al. | 452/179 |
| 5,279,518 | 1/1994 | Ekiss et al. | 452/128 |

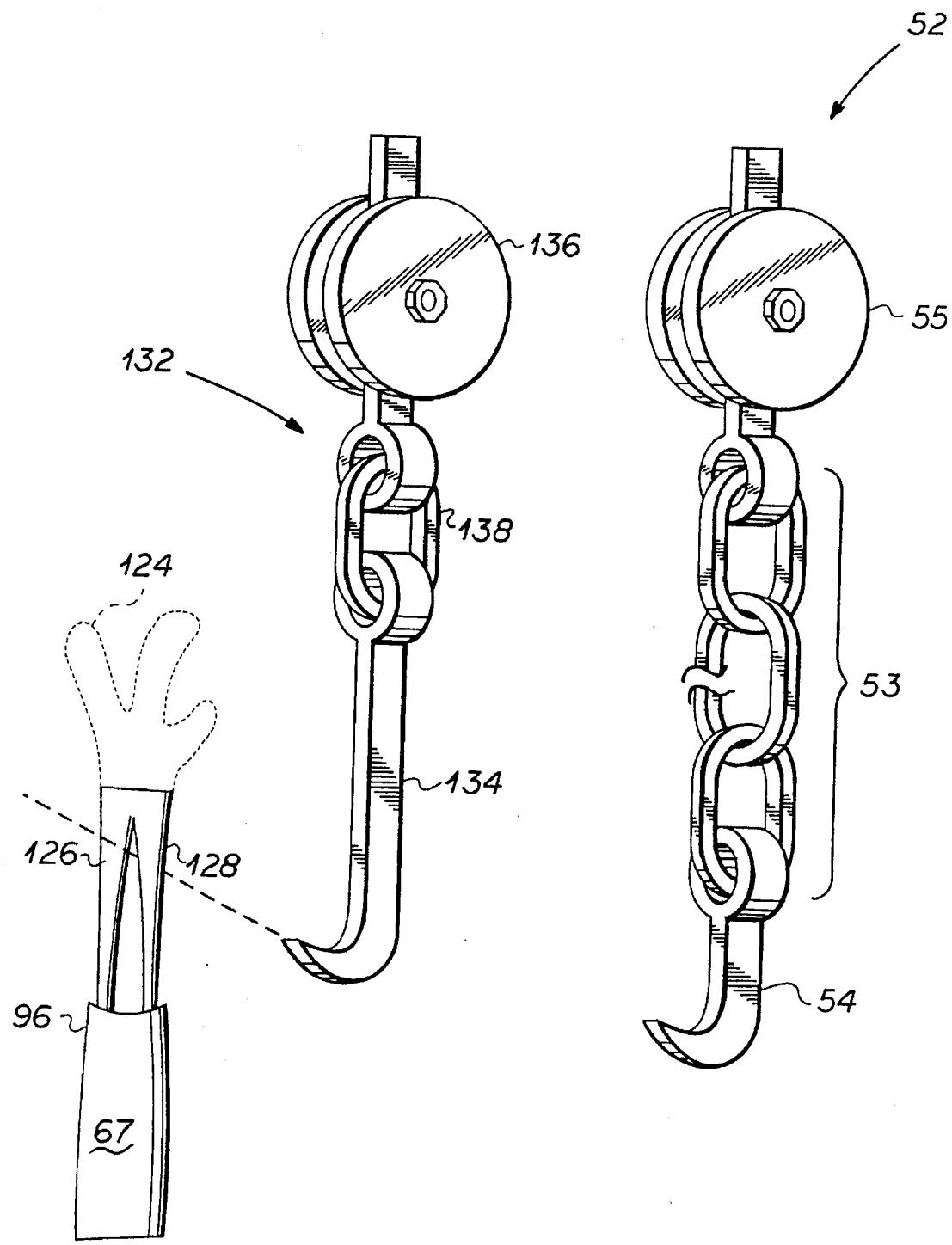
FIG 14   FIG 5

CRADLE AND METHOD FOR THE SLAUGHTERING OF RATITES, INCLUDING OSTRICH AND EMU

This document is a continuation-in-part patent application of parent patent application entitled, "METHOD FOR SLAUGHTERING AND REMOVING THE HIDE FROM RATITES, INCLUDING OSTRICH AND EMU," Ser. No. 08/086,221, filed Jul. 1, 1993, now U.S. Pat. No. 5,405,289, which is a continuation-in-part patent application of parent patent application entitled "METHOD FOR HUMANE SLAUGHTER AND PROCESSING OF DOMESTICATED OSTRICH," Ser. No. 07/713,467, filed Jun. 10, 1991, now U.S. Pat. No. 5,246,396.

BACKGROUND OF THE INVENTION

1. Field of the Invention

The present invention relates generally to the humane slaughtering and processing of animals. The invention has particular application to the slaughtering and processing of large, heavy, hostile ratites (Order: *Struthioniformes*), for example but not limited to, ostrich (Suborder: *Struthiones*; Family: *Struthionidae*) and emu (Suborder: *Dromai*; Family: *Dromaiidae*).

2. Background Art

Ratites, which are defined herein as all those animals in the order Struthioniformes, are the best known of flightless birds. Although ratites have a wing skeleton and feathers, which are not fundamentally different from those of flying birds, ratites cannot fly. They have a simplified wing skeleton and musculature, degenerated breast muscles, a retrogressed keel of the sternum, an almost absent wishbone (furcula), degenerated flight and tail feathers, and leg bones without air chambers. It is generally recognized that ratites evolved from flying ancestors and lost their ability to fly as their body size increased over time. These changes over time have led to considerable changes in the bones, muscles, and plumage, as compared to other birds.

Ratites include six genera with ten species, as well as two extinct families, one of which is a separate suborder with ten genera and about twenty-five to thirty species. Well known ratites include ostrich (Suborder: *Struthiones*; Family: *Struthionidae*) and emu (Suborder: *Dromai*; Family: *Dromaiidae*). Ostrich are very large, two-toed birds indigenous to Africa and Arabia. Ostrich are the largest of living birds. Ostrich typically have heights of around 8 feet, lengths of about 6 feet, and weights of over 300 pounds. Moreover, Emu are very large birds indigenous to Australia. Emu resemble ostrich, but are smaller in overall size, typically having heights of around 5 feet, lengths of about 6 feet, and weights of over 250 pounds.

Historically, ratites, such as ostrich and emu, have been slaughtered for their plumage, or feathers. However, in recent years, other body parts have been extensively used to better the standard of living of human beings. For example, eye lenses of ratites have been recognized by scientists and medical researchers to be extraordinarily useful for transplant in humans. As a further example, the hide, or skin, is now used for making purses, boots, and other forms of clothing. The public has responded favorably to the latter innovation. Consequently, a huge demand exists for the hide, which has become an expensive commodity.

The slaughtering of ratites has almost exclusively been limited to their respective continents of origin. For instance, ostrich and emu have been always been slaughtered in Africa and Australia, respectively. In the United States, the raising of ratites for slaughter and processing is extremely limited. Usually, a farmer on a small family farm raises a few of these birds along with his other livestock.

Ratites, particularly ostrich and emu, are very large creatures and have volatile behaviors, making them dangerous and burdensome to handle, slaughter, and process. Moreover, the slaughtering processes known in the art for these animals are very crude. These large animals are usually slaughtered as follows. First, one of these animals is grasped about the head and is roped at the ankles. Next, the animal is hoisted into the air in an inverted position and its throat is cut. The blood is allowed to drain. Further, the hide is cut from the animal. Finally, the animal is gutted so that the meat can be cut from it. Hence, the methodology is crude and primitive.

Essentially, there are no known processes in the world for large scale slaughtering and processing of ratites. Moreover, in order to slaughter and process these large animals on a mass scale for commercial gain in the United States, approval must be obtained by the United States Department of Agriculture (U.S.D.A.). In its history, the U.S.D.A. has never approved a slaughtering and processing technique for ratites, including ostrich or emu.

Needless to say, in utilizing the primitive slaughtering and processing methods, much of these animals are wasted, due to the crude procedures. For example, in order to properly remove many of the useful internal organs, such as the eye lenses, the organs must be carefully and methodically removed very soon after the animals are slaughtered and then refrigerated in some adequate fashion. In addition, the organs can contaminate each other during the slaughtering process, rendering many of them unfit for human use and consumption. For instance, fluids from the esophagus or gizzard can taint other organs, rendering them unfit.

Furthermore, conventional methods for the slaughter and processing of other birds, such as chickens, turkeys, ducks, geese, etc., are not usable for ratites. Ratites are much larger and heavier than other birds. Also, ratites have much more volatile and violent behaviors, and possess different types of useful body parts, for example, hide and eye lenses, as compared with other birds.

Thus, a heretofore unaddressed need exists in the industry for a method of humanely slaughtering and efficiently processing ratites, and particularly, ostrich and emu, which are generally large, heavy, and hostile creatures, on a mass scale while preserving the quality of body parts during removal. Particularly, a methodology is needed for removing the valuable hide from these animals without damage to the hide during removal.

SUMMARY OF THE INVENTION

Briefly described, the present invention is a method for removing the hide from ratites, including for example but not limited to, ostrich or emu, which are generally large, heavy, hostile animals, on a mass scale without damage to the hide during removal. The novel method generally comprises the following procedure. A rugged overhead rail system is provided in a facility for permitting movement of the ratites through processing areas. The ratites are rendered unconscious via, for instance, an electrical charge, stunned via a stun gun, and/or gassed via an intoxicating gas, and then suspended in an inverted position on the rail system. Further, in each ratite, the hide and muscle tissue are separated by injecting air into the ratite at various locations.

This procedure loosens the feathers. Next, the loosened feathers are removed from the hide of the ratite, and then the hide is carefully removed from the ratite by cutting the hide at desired locations, while preserving the quality thereof.

In an alternative methodology, the ratite is lowered from the rail system onto a cradle for processing of body parts and/or transporting the ratite to another area of the facility. The cradle holds the ratite in place while body parts of the ratite are being removed and provides a means for transporting the ratite throughout the facility. Once the desired body parts have been removed, the ratite may be re-suspended from the same or another rail system for further processing.

Further features and advantages of the present invention will become apparent to one skilled in the art upon examination of the following drawings and the Detailed Description section hereinbelow.

BRIEF DESCRIPTION OF THE DRAWINGS

The present invention, as defined in the claims, can be better understood with reference to the text and to the following drawings. The drawings are not necessarily to scale, emphasis instead being placed upon clearly illustrating principles of the present invention.

FIG. 5 is a side perspective view of a shackle for hanging a ratite from a rail system of FIG. 2;

FIG. 14 is a side perspective view of a trolley hook for hanging a ratite by a footless leg from the rail system of FIG. 2;

DETAILED DESCRIPTION OF THE PREFERRED EMBODIMENT

Figure 1:
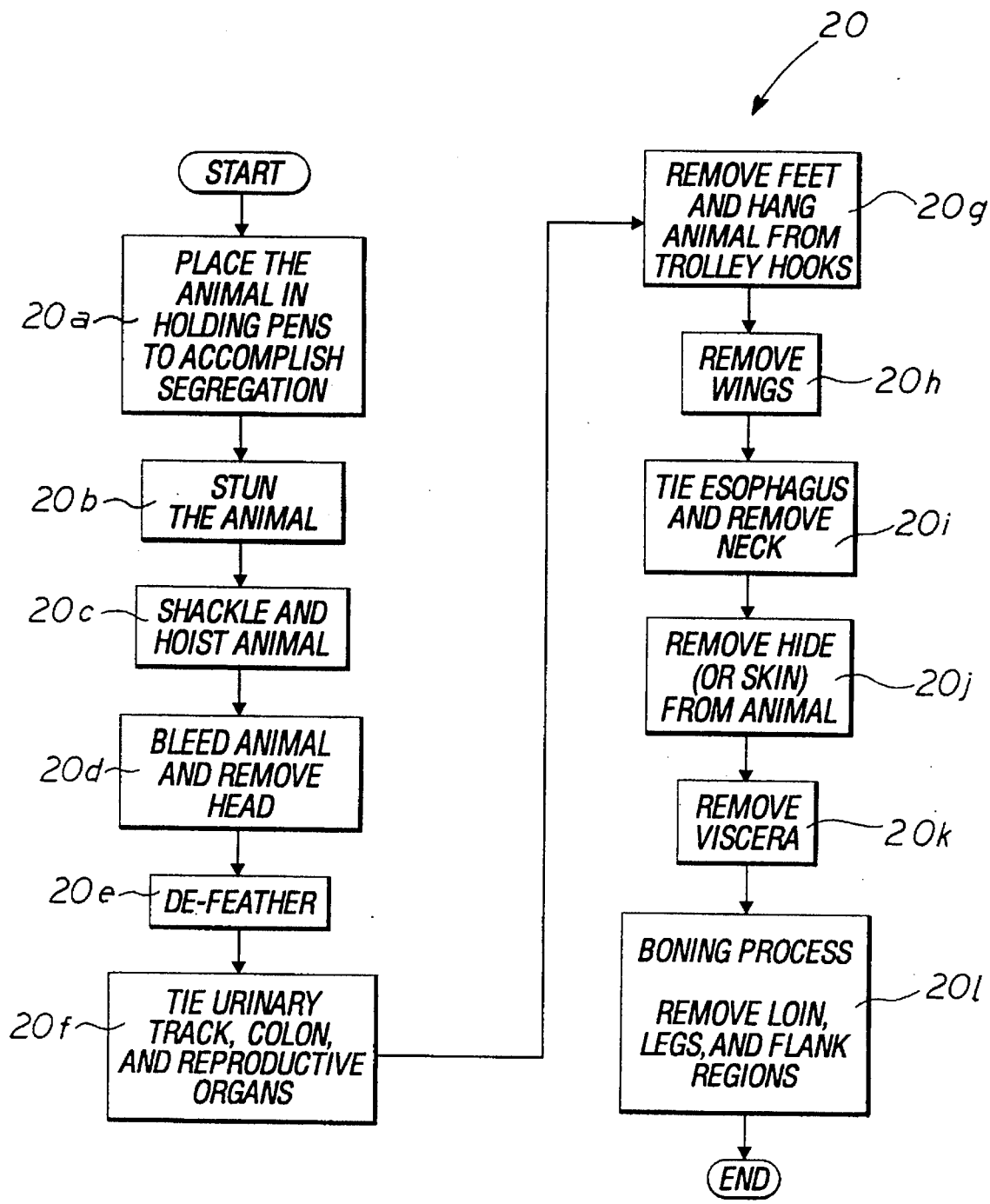
FIG. 1 is a flow chart showing generally a novel methodology of the present invention.
Figure 2:
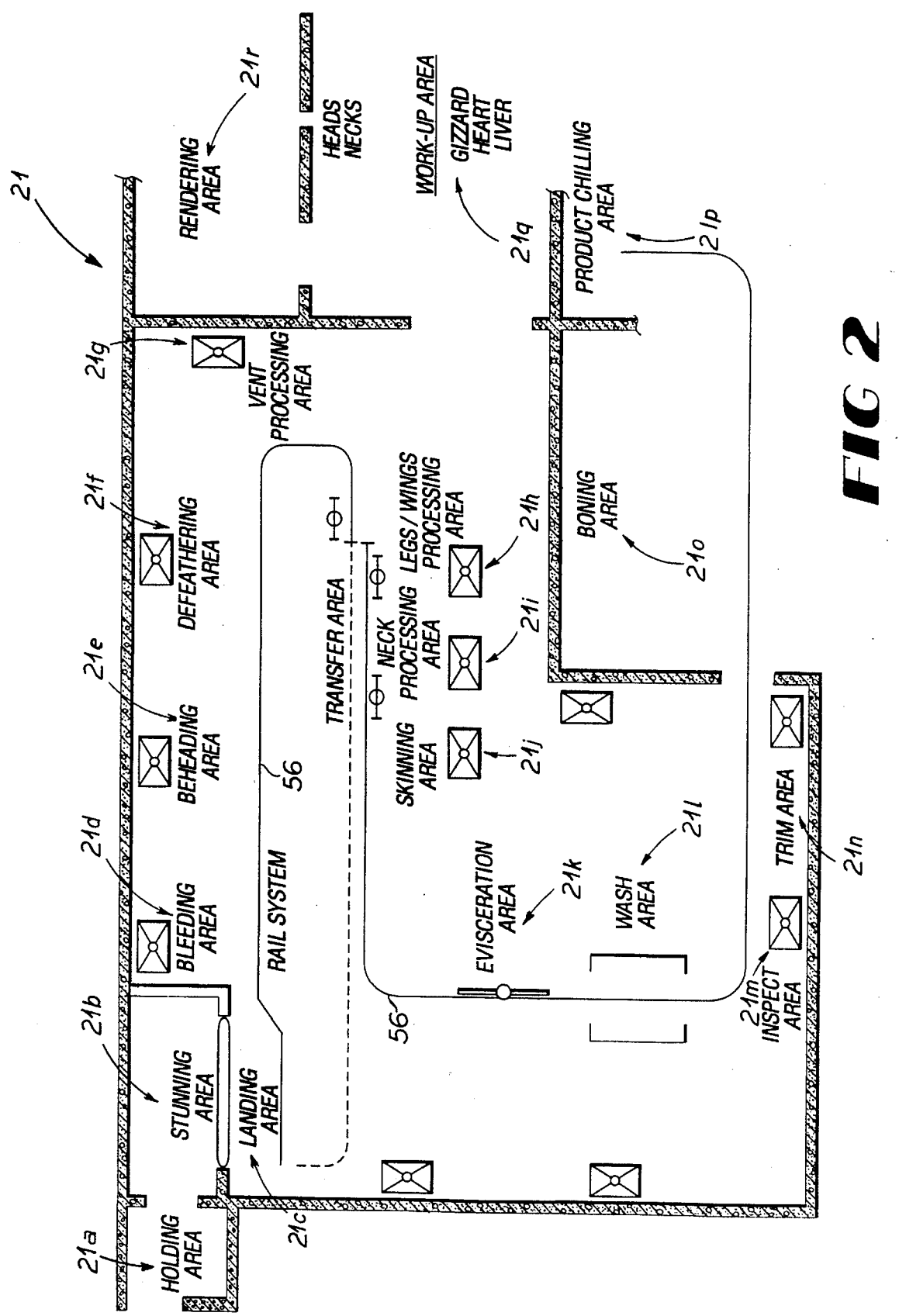
FIG. 2 is a top plan view of an example of a facility for implementation of the methodology of FIG. 1.

With reference now to the figures wherein like reference numerals designate corresponding parts throughout the several views, a novel slaughtering and processing methodology 20 in accordance with the present invention is illustrated in FIG. 1. The methodology 20 is set forth in a flow chart format, wherein successive steps in the procedure are denoted by reference numerals 20a through 20m. In accordance with the methodology 20, ratites, including ostrich or emu, which are generally large, heavy, hostile animals, are humanely slaughtered and efficiently processed on a mass scale in an operational facility 21, constructed for example, as shown in a top plan view of FIG. 2. FIGS. 1 and 2 will be referred to hereinafter during the detailed discussion of the preferred embodiment and related alternative embodiments thereof. Also worth noting is that in this document, unless otherwise specified, the term "ratite" means in a living or dead predicament as well as in whole or in part, depending upon its particular point in the novel processing.

Figure 3:
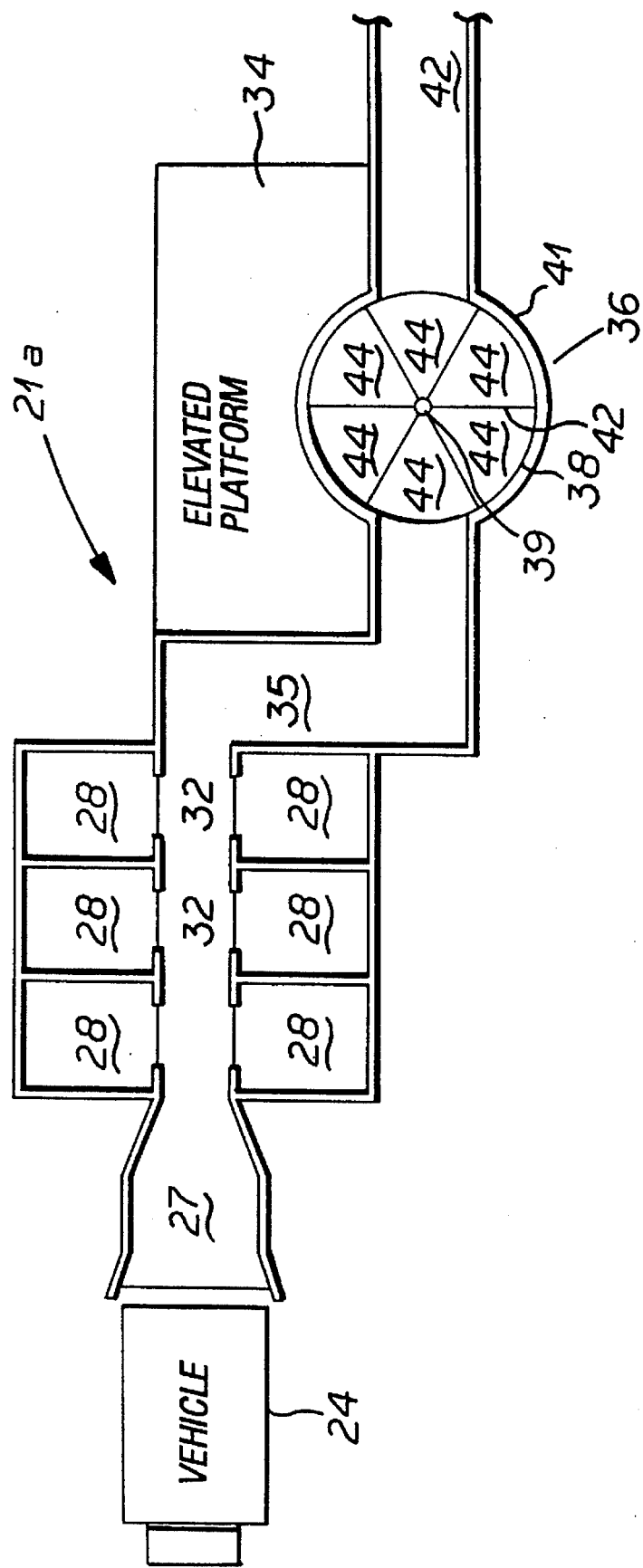
FIG. 3 is a top plan view a holding area for the facility of FIG. 2.

With reference to FIG. 3, living ratites are initially unloaded from a transportation vehicle 24 into a holding area 21a via a loading/staging area 27. The ratites remain in the holding area 21a until a representative of the U.S.D.A. inspects the ratites. Pursuant to governmental guidelines, the U.S.D.A. must inspect the ratites prior to the initiation of the novel processes described herein.

Because ratites are large and often hostile animals, movement of these animals from the transporting vehicle 24 to the slaughter facility 21 is an extremely dangerous procedure for the facility workers and can be an area where the animals are damaged or killed, if sufficient safeguards are not employed.

To this end, the holding area 24 comprises numerous large holding pens 28 for segregating these ratites. (Step 20a of FIG. 1) In contrast to conventional corral bar systems utilized for other livestock, the walls of the loading/staging area 27 and the holding pens 28 are approximately 10 feet in height so that the ratites cannot see outside the confined areas. Moreover, the holding pens 28 are designed to hold only a few ratites, preferably only one. Limiting the number of ratites in each holding pen 28 minimizes damage (bruises and the like) caused to the ratites as a result of the enclosure itself and as a result of interaction with other ratites, because these large ratites tend to have very volatile and violent behaviors.

The holding pens 28 have respective gates 32 which can be opened and closed manually, hydraulically, electrically, or otherwise to permit ingress and egress of a ratite(s) for confinement purposes. If controlled hydraulically or electrically, these gates are operated by a facility worker positioned on an elevated platform 34. Hence, the facility worker is fully protected.

The holding pen gates 32 connect to a common aisle way 35 which leads to a movable staging area 36. The movable staging area 36 has a rotatable circular turntable 38 which is rotatable about an axis 39. The turntable 38 has a plurality of radial, upstanding vertical walls 42, which divide the turntable 38 into a plurality of confinement sectors 44, and has an outer perimeter wall 41 wherein the turntable 38 rotates. From the aisle way 35, the ratites are herded one by one into the confinement sectors 44 as the turntable 38 is rotated. The turntable 38 is rotated manually, hydraulically, electrically, or otherwise by a facility worker situated on the elevated platform 34. In addition to minimizing damage to the hostile ratites, the turntable 38 promotes efficiency by passing ratites to the slaughtering areas when they are ready to move and by regulating the flow of ratites into the slaughtering areas. The ratites are moved around axis 39 and are permitted to leave the confinement sectors 44 into an aisle way 42 which leads to a stunning area 43.

The ratites often lie down, and it is difficult to move them due to their immense size. Accordingly, a moving means, such as an escalator-like apparatus, is envisioned for moving the ratites through the facility 21 if they lie down and cannot be provoked to move. Specifically, as an example, a moving means may be disposed for moving ratites along aisle ways 35, 42 of FIG. 3. Any conventional escalator apparatus which can handle the weight and control parameters with respect to the present invention may be utilized.

Figure 4A:
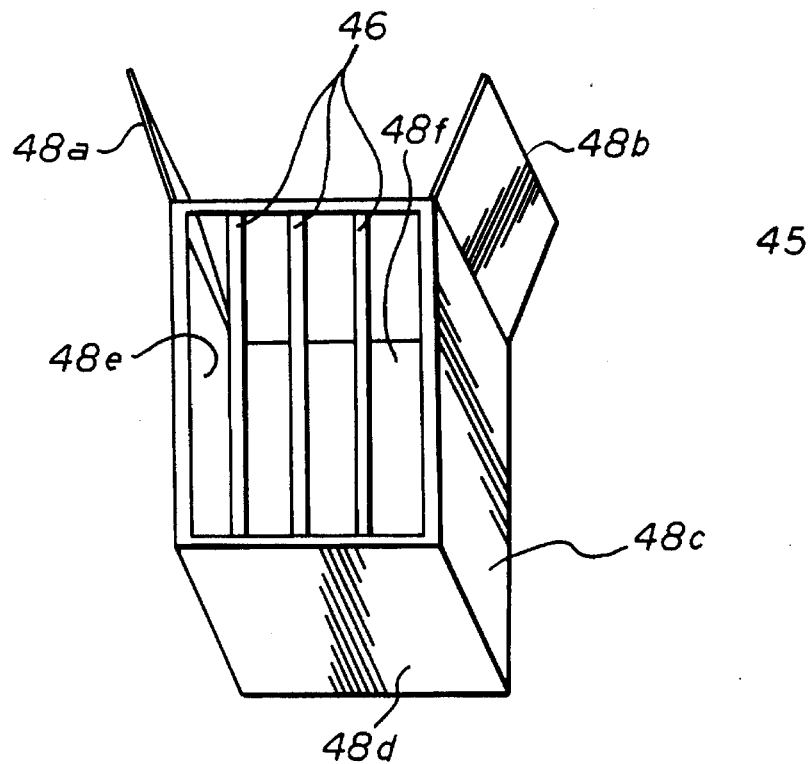
FIG. 4A is a top perspective view of a knocking box (in an opened condition) for a stunning area of FIG. 2.
Figure 4B:
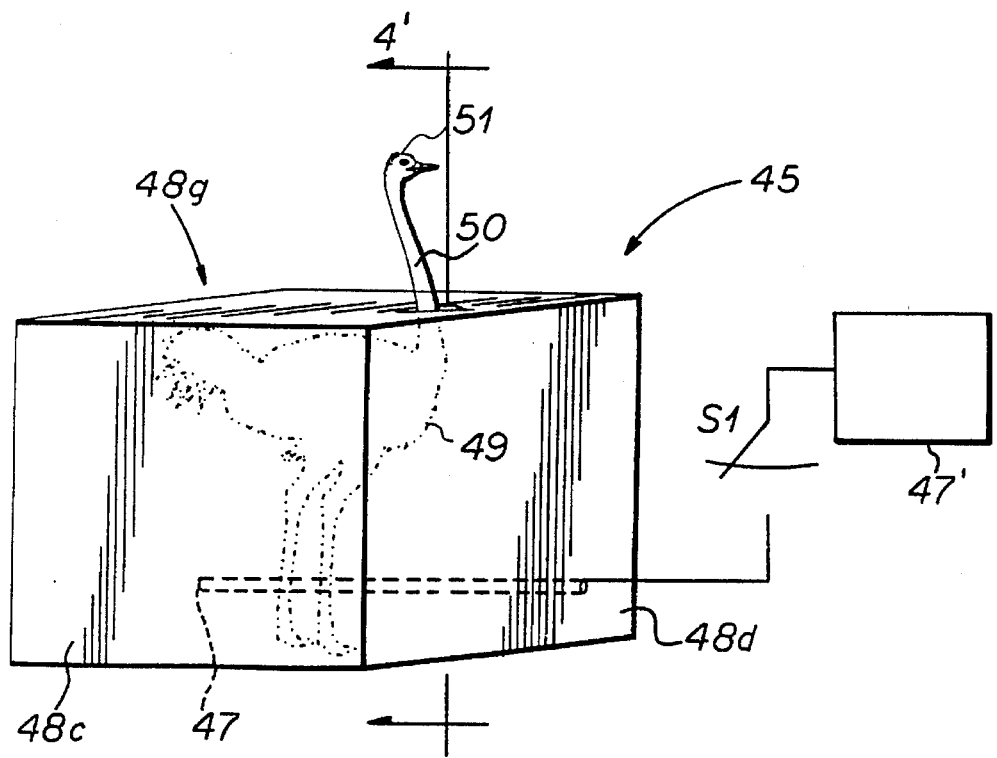
FIG. 4B is a side perspective view of the knocking box (in a closed condition) of FIG. 4A with a ratite, such as an ostrich or emu, positioned therein.
Figure 4C:
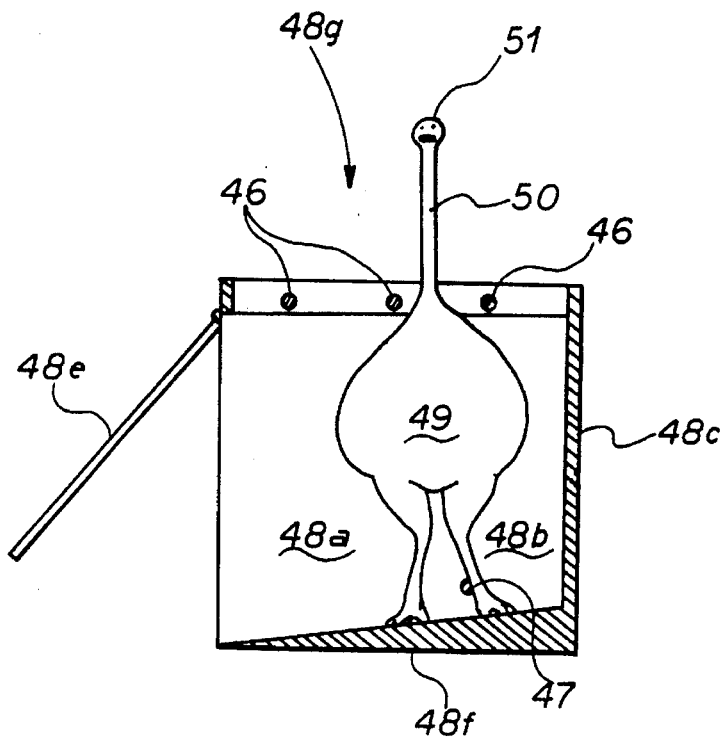
FIG. 4C is a side cross sectional view of the knocking box (in a closed condition) of FIGS. 4A and 4B taken along line 4'—4'.

Each ratite 49 is individually herded into a stunning area 21b (FIG. 2) having one or more (preferably, a plurality) knocking boxes 45, which are utilized to render the ratites 49 unconscious, as is further described hereinbelow. (Step 20b of FIG. 1) In accordance with the present invention, each knocking box 45 is constructed as shown in FIGS. 4A, 4B, and 4C. The knocking box 45 is generally rectangular in configuration having sides 48a–48g and is fabricated from wood, metal, plastic, or any other suitable material having enough strength for confining a ratite 49. The knocking box 45 preferably has two hinged door panels 48a, 48b, serving as doors through which the ratite 49 enters the knocking box 45. The door panels 48a, 48b can be securely closed via any suitable locking mechanism. A plausible alternative embodiment to the pair of doors 48a, 48b is a single sliding door (not shown) which slides upward on rails affixed to sides 48c 48d in order to permit entry of ratite 49 into the knocking box 45. While in the knocking box 45, the ratite 49 is rendered unconscious so that it may be killed in a humane manner, in accordance with U.S. federal law (the Humane Slaughtering Act).

The knocking box 45 is designed to restrict the movement of the ratite 49 while permitting the ratite 49 to extend its head 51 and/or neck region 50 outside of the restraining area. To this end, the knocking box 45 may be open at the top side 48g, may comprise one or more open channels at the top side 48g, or may comprise a hole at the top side 48g so that the head 51 and/or neck region 50 of the ratite 49 are exposed. In the preferred embodiment, the knocking box 45 is generally open at the top side 48g, but comprises a plurality of elongated cylindrical metal bars 46, preferably three in number, running along the top side 48g and extending from the doors 48a, 48b to the opposing side 48d, as shown in FIG. 4A. The bars 46 are spaced so as to enable a ratite 49 to protrude its head 51 and/or neck region 50 through the openings between the bars 46 and out of the knocking box 45, as illustrated in FIG. 4B and 4C. The bars 46 are also securely anchored to the box 45 on side 48g at their respective ends so as to insure that the ratite 49 is safety contained therein after the doors 48a, 48 are securely closed.

In order to render the ratite 49 unconscious while in the knocking box 45, the ratite 49 is preferably shocked into unconsciousness via an appropriate electrical charge applied to a body part. In one embodiment, the head 51 and/or neck region 50 of the ratite 49 is given an electrical shock of sufficient energy (voltage and/or power range approved by the U.S.D.A.) to stun the ratite 49. Using a shocking apparatus, such as an energized glove, stunning wand, stunning gun, or other electrical discharge mechanism, an electrical charge is applied to the exposed neck region 50 and/or head 51 of the ratites 49, thereby causing the ratite 49 to become stunned, but remain alive. In the preferred embodiment, a 0.22 cal. gun having a 0.22 cal. stunning capsule is utilized to shoot an electrical charge approximately 6 to 8 inches into the skull region of the ratite 49. The 0.22 cal. stunning gun is positioned to shoot the ratite 49 between the eyes or at the temporal region.

In another embodiment of the present invention for electrically stunning the ratite 49, an electrical charge is applied to a foot and/or a leg of the ratite 49 via an electrical discharge mechanism positioned near the floor 48f of the knocking box 45. Applying a charge to these body parts is advantageous because they do not have feathers which can insulate the ratite 49 from receiving electrical charge. In the preferred embodiment, the electrical discharge mechanism is an elongated metal bar 47 situated approximately 6 to 12 inches off of the floor 48f of the knocking box 45, as illustrated by phantom lines in FIG. 4B. The bar 47 selectively receives electrical charge from a power source 47' via a switch S.

Optionally, the bar 47 may be configured so that it is movable along the knocking box floor. For instance, the bar 47 may be slidable through a hole in a side 48c–48f and, optionally, guided by a track means. In this embodiment, the bar 47 can be moved automatically by a control means or manually by a facility worker via an insulated handling mechanism (not shown) exposed externally from the knocking box 45. Another example for a configuration of a movable bar 47 is to hingedly connect the bar 47 at an end and move the bar 47 automatically by a control means or manually by a facility worker via an insulated handling mechanism (not shown) exposed externally from the knocking box 45. With either of these configurations, the bar 47 may be selectively moved in contact with the ratite 49 for shocking the ratite 47.

After stunning, each ratite 49 is rolled out of the knocking box 45 into a landing area 21c (FIG. 2). To this end, a door is disposed in any side 48c–48f of the knocking box 45 for dropping the ratite 49 into the landing area 21c. Preferably, the door is situated on side 48e, as shown in FIG. 4C, and is hinged at the top for moving the door outwardly and upwardly from the knocking box 45 to permit movement of the ratite 49 therefrom. In another embodiment, the door may be pivotal about a rod, bolt, or other suitable axis which is disposed at approximately its midsection. In this configuration, when the door is opened, the bottom half of the door moves outwardly away from the box 45, whereas the top half of the door moves inwardly into the box 45. The door may also be automatically controlled in either of the preceding configurations, if desired. Furthermore, the floor 48f may be slanted toward the door opening, as further illustrated in FIG. 4C, to aid in transporting the heavy ratite 49 out from the knocking box 45 and ultimately into the landing area 21c.

Figure 6:
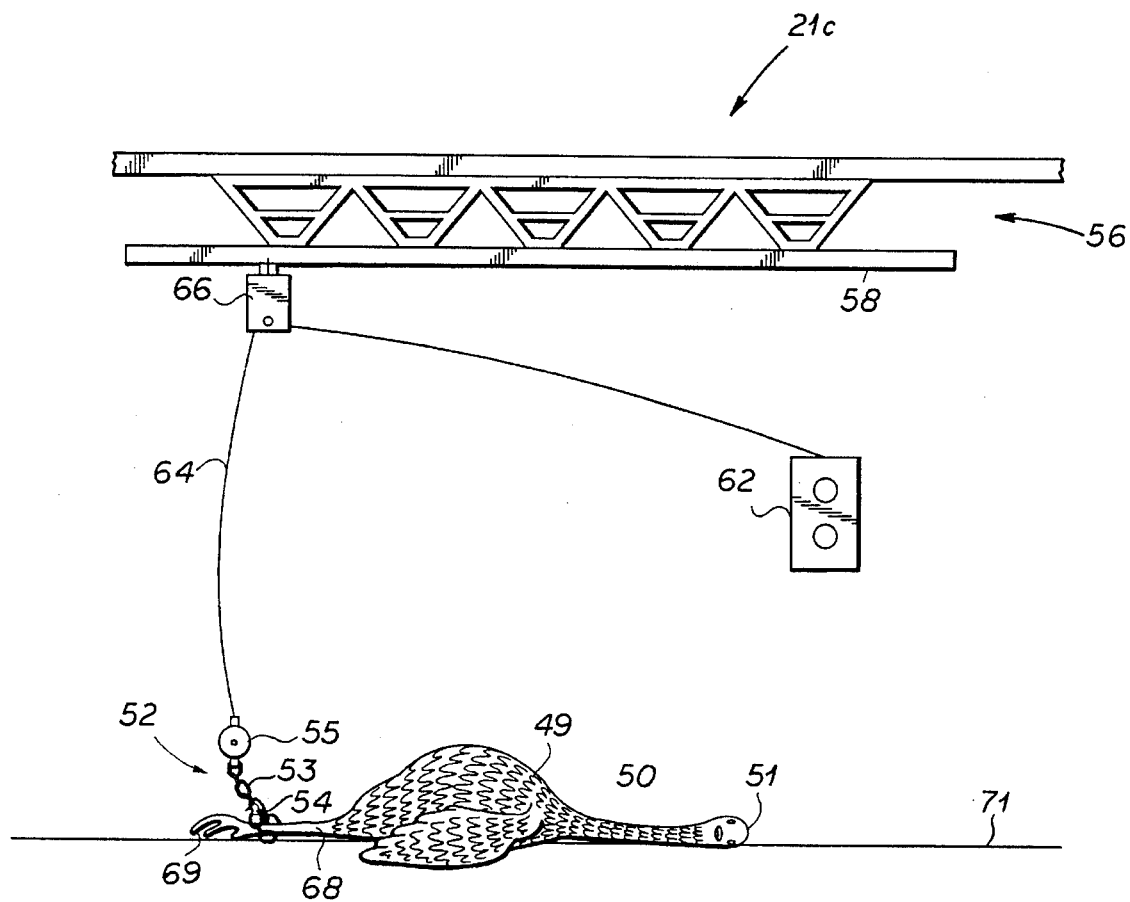
FIG. 6 is a side schematic view a hoist apparatus for hoisting a ratite having the shackle of FIG. 5 upward and onto the rail system of FIG. 2.

In order to permit efficient processing of body parts on a mass scale while preserving the quality of the body parts without damage during removal, an overhead rail system 56, shown in FIG. 6, is provided in the facility 21 for permitting movement of the ratites 49 in succession through the various processing areas of the facility 21. The process 20 will be described hereafter with respect to a single ratite 49 for simplicity, but it should be understood that the ratites 49 move through the facility 21 in succession on the rail system 56 and that the procedures implemented at the various facility areas are performed repetitively by facility workers at those areas on successive ratites 49 moving along the rail system 56.

After the stunned ratite 49 reaches the landing area 21c, a chain, cable, or attachment mechanism is placed around a leg 68 of the ratite 49, just above the foot 69. A shackle 52 serving as the attachment mechanism in the preferred embodiment is shown in FIG. 5. The shackle 52 comprises a chain 53 of any desired length which connects a small end hook 54 at one end of the shackle 52 to a rolling mechanism 55 at the other end thereof. The chain 53 is wrapped around the leg 68 of the ratite 49 and the end hook 54 is hooked onto the chain 53, as in a well known slip-knot configuration. As illustrated in FIG. 6, the overhead rail system 56 has a horizontal riding rail 58 for receiving the rolling mechanism 55 of the shackle 52.

In order to place the rolling mechanism 55 on the riding rail 58 to thereby hang the ratite 49 in an inverted position, the shackle 52 is connected to a hoist mechanism. The hoist mechanism is preferably comprised of driving mechanism 62, such as a motor, engine, or other line pulling apparatus having a drive pulley, configured to pull and coil a cable 64 over a guide pulley 66 mounted to the riding rail 58. The cable 64 is preferably connected to the shackle 52 at the end nearest the rolling mechanism 55. Accordingly, the ratite 49 is lifted from the facility floor 71 and suspended by the shackle 52 in an inverted position. (Step 20c of FIG. 1) In the preferred embodiment, the ratite 49 is suspended from the riding rail 58 at approximately 15 feet above the facility floor 71 to permit easy movement throughout the slaughtering process and prevent contamination of the ratite 49.

Figure 7:
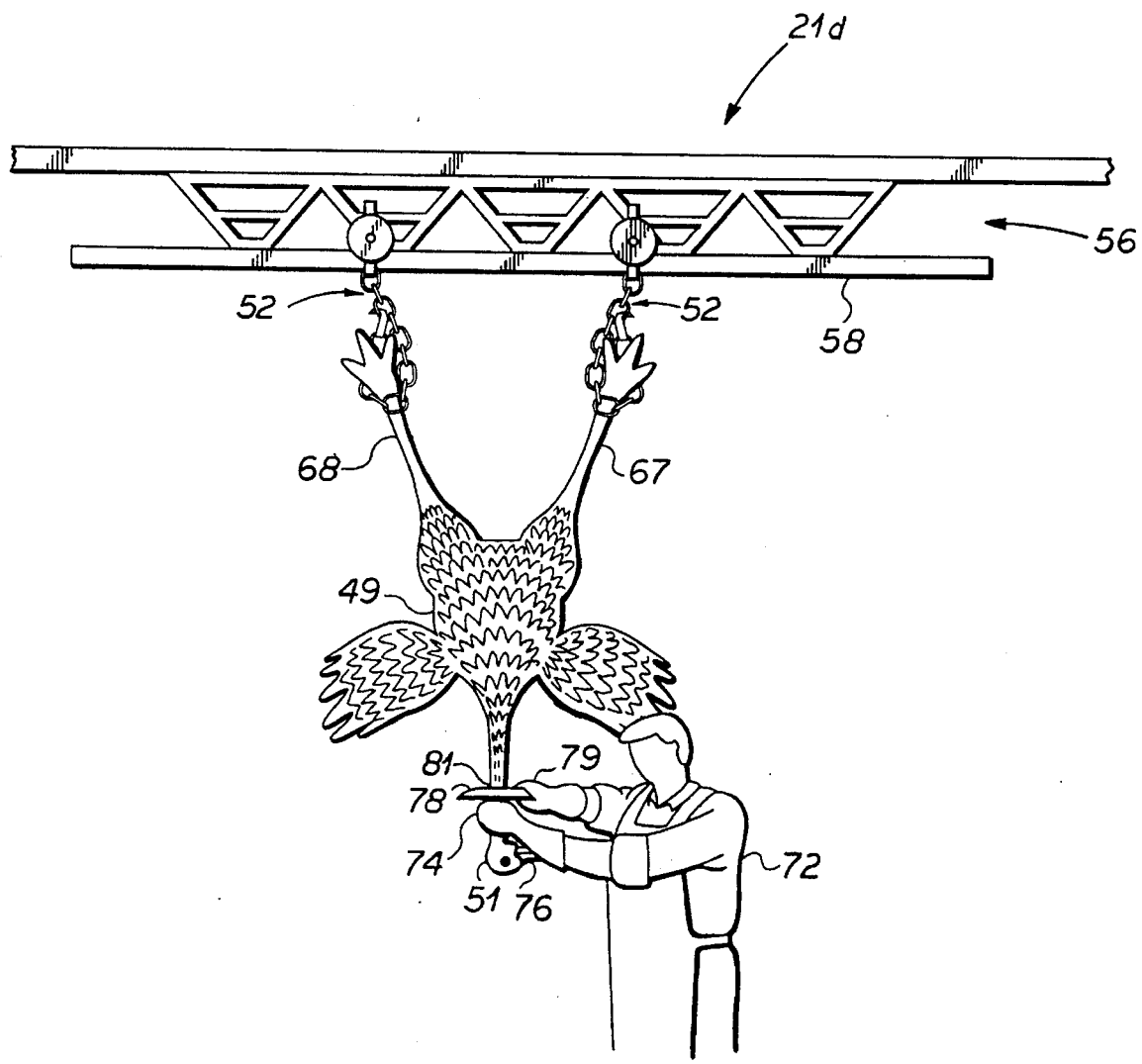
FIG. 7 is a side schematic view of a bleeding area of FIG. 2 illustrating a bleeding procedure.

The suspended ratite 49 is next moved via the rail system 56 to a bleeding area 21d (FIG. 2), which is about 10–20 feet from the landing area 21c. The bleeding area 21d is shown in greater detail in FIG. 7. Referring to FIG. 7, a facility worker 72 uses one hand 74 to position the head 51 of the ratite 49 by grasping the beak area 76 of the stunned ratite 49. Utilizing a knife 78 in the other hand 79, the facility worker 72 makes a 4–6 inch horizontal cut 81 across the arteries in the neck region to cause blood flow and/or across the windpipe, thereby permitting the ratite 49 to be humanely killed. (Step 20d of FIG. 1)

The blood which seeps from the ratite 49 is collected for further processing into other products such as fertilizers, etc. The blood may be collected by using any conventional means, such as a container or gutter-like system positioned below the ratite 49 during the bleeding process. Worth noting is that it takes approximately one to three minutes for all of the blood to drain from the ratite 49.

While the ratite 49 is in the bleeding area 21d, another shackle 52 is affixed to the free leg 67 of the ratite 49. The second shackle 52 may be affixed to the ratite 49 before or after the bleeding process. The free leg 67 is shackled in order to further stabilize the ratite 49 for procedures which will be later performed at other processing areas of the facility 21. However, in some circumstances it may be appropriate and/or even desirable not to affix a second shackle 52 to the free leg 67. For instance, it would be preferable to shackle only one leg 68 of ratite 49 if shackling both legs 67, 68 would inhibit the facility worker's ability to access the vent region of ratite 49 for processing, typically by restricting the ability to adequately separate legs 67, 68 of ratite 49.

After sufficiently bleeding the ratite 49, the ratite 49 is moved to a beheading area 21e (FIG. 2) where the head 51 is removed utilizing a large scissor-like apparatus or any other apparatus capable of severing the head 51. (Step 20d of FIG. 1) After severing, the head 51 is transported from the beheading area 21e to a work-up area 21q (FIG. 2). From the head 51, several ratite body parts will be removed for medical and pharmaceutical purposes. For example, the eye balls in their entirety and associated appendages are removed. The lenses in the eye balls are of vital medical use as transplant lens in human beings. The eye balls along with their associated appendages are placed in an ice bath for proper preservation. After sufficiently reducing the body temperature of the eye balls and associated appendages, they are immediately packaged for shipment to an appropriate medical facility. Additionally, other portions of the head are removed and processed for medical, pharmaceutical, and other uses, and the remaining by-products of the head 51 are transported to a rendering area 21r (FIG. 2) (inedible products), for further processing as noted further hereinafter.

Figure 8:
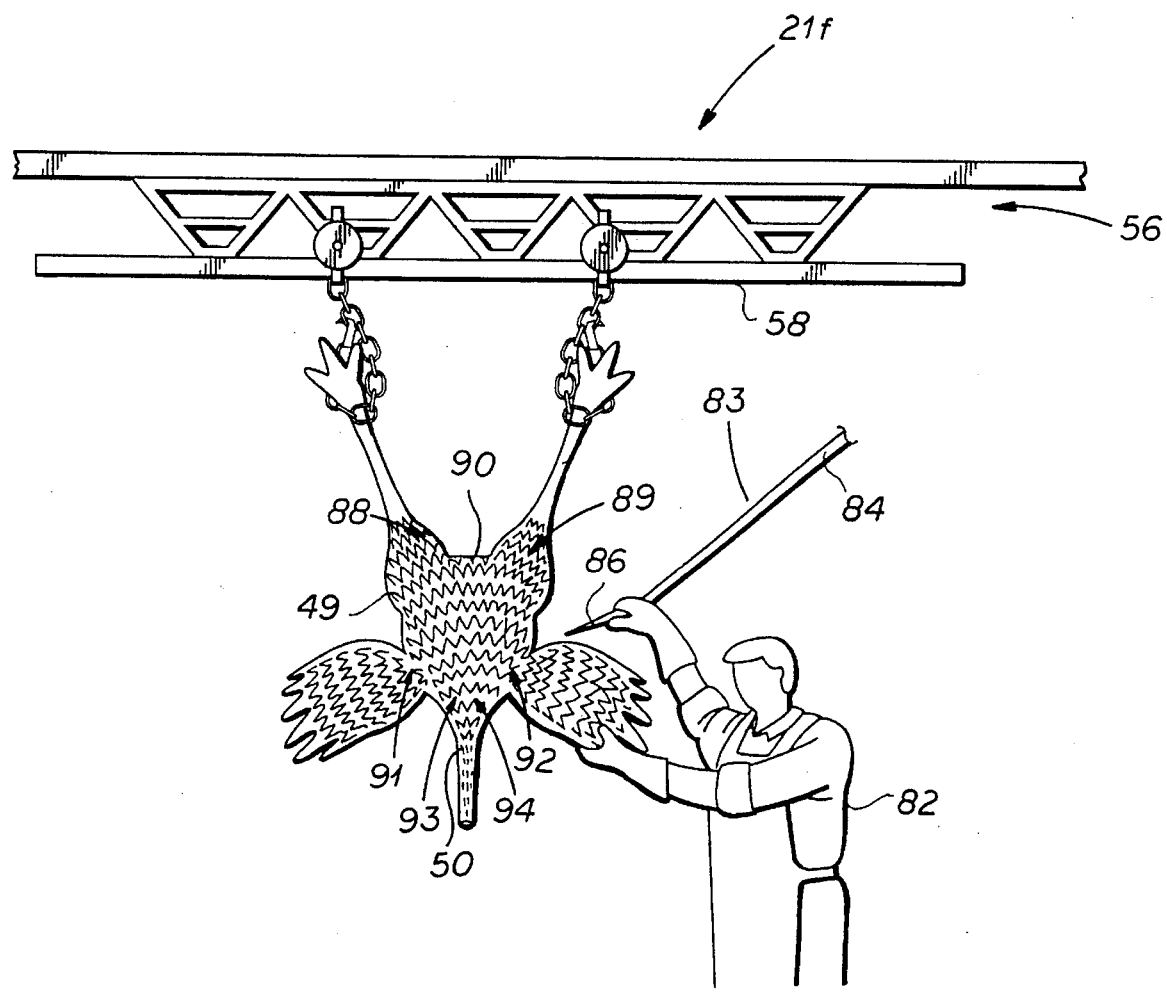
FIG. 8 is a side schematic view of a de-feathering area of FIG. 2 illustrating the application of pressurized air during a de-feathering procedure.
Figure 9:
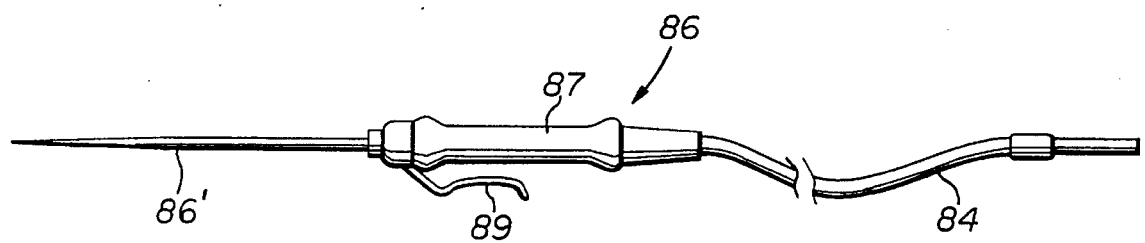
FIG. 9 is a side perspective view of an air probe used in the de-feathering area of FIGS. 2 and 8 during the defeathering procedure.

The beheaded ratite 49 continues through the facility 21 via the rail system 56 to a de-feathering area 21f (FIG. 2), where the feathers of the ratite 49 are carefully removed so that the valuable hide of the ratite 49 is not damaged. (Step 20e of FIG. 1) The de-feathering area 21f is meticulously isolated from the remainder of the facility 21 so as to confine the feathers and not permit them to contaminate any of the other ongoing procedures taking place in the facility 21. In the preferred embodiment, the de-feathering area 208 is isolated by air curtains and/or physical barriers to prevent any feathers from contaminating the rest of the facility 21. In the de-feathering area 21f, as further illustrated in FIG. 8, a facility worker 82 uses an air apparatus 83 for providing pressurized air in order to carefully remove the feathers from the ratite 49. As shown in FIGS. 8 and 9, the pressurized air apparatus 83 comprises an air hose 84 for supplying pressurized air to a needle-like probe 86 of approximately 2 to 6 inches in length. The air is preferably passed through two filtration systems prior to release through the air hose 84 so that only clean air is utilized. Providing clean air is critical in preserving the integrity of body parts. The needle-like probe 86 comprises a handle 87 to be grasped by the facility worker 82 for maneuvering the probe 86. Protruding outwardly from the handle 87 is a trigger lever 89 for dispensing air upon depression thereof at the will of the facility worker 82. Finally, a sharp penetration needle 86', preferably metal, protrudes from the handle 87 and is configured for insertion into the ratite 49. The sharp penetration needle 86' has an internal centrally-situated throughway (approximately 1/50 to 1/10 inches in diameter), similar to the structure of a medical hypodermic needle, for passage of air into the ratite 49 from the hose 84.

The needle-like probe 86 is inserted and air is injected at various strategic locations on the suspended ratite 49 to effectuate proper de-feathering without harm to the hide. The probe 86 is inserted and air is injected at the locations 88, 89, 91–94 shown in FIG. 8 on the front side (breast side) of the ratite 49 as well as on the back side (not shown) of the ratite 49 at substantially the same locations. More specifically, air is injected via the probe 86 in the following locations within 10 percent of accuracy: in the hock area within about 3 inches from the base of each leg (reference numerals 88, 89); at the base of the spinal column (known as the wing set area) within about 3 inches of the vent 90 (opposite to reference numerals 88, 89); within about 3 inches of the base of each wing on both sides of the wings (reference numerals 91, 92 and opposite to reference numerals 91, 92); and at the top of the spinal column within about 3 inches from the base of the neck 50 on both sides of the ratite 49 (reference numerals 93, 94 and opposite to reference numerals 93, 94). Thus, in all, a total of twelve air injections are performed in the preferred embodiment of the present invention.

Figure 10:
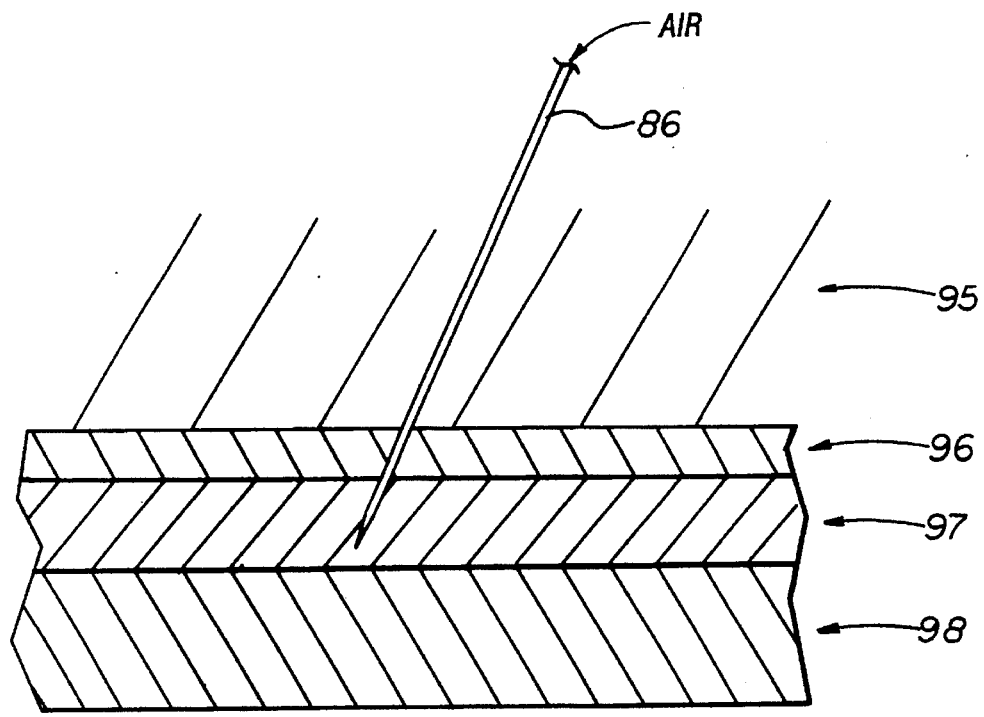
FIG. 10 is a partial side cross sectional view of the outer body layers of a ratite illustrating injection of air with the air probe of FIG. 9 for loosening the hide of the ratite during the de-feathering procedure of FIG. 8.

When the probe 86 in inserted into the ratite 49, the penetration depth of the probe 86 is important and is described relative to FIG. 10. FIG. 10 shows a cross section of the various outer body layers of the ratite 49, including in succession the following: feathers 95, hide 96, fat layer 97, and muscle tissue 98. When the probe 86 is inserted at the previously-mentioned locations, the probe 86 penetrates the hide 96 and rests on the outside of the muscle tissue 98 in the fat layer 97, as illustrated in FIG. 10. This depth is approximately ¾ inches. After insertion of the probe 86 at each of these locations, pressurized air at approximately 50–110 p.s.i. is applied to the probe 86 causing the fat layer 97 between the hide 96 and the muscle tissue 98 to become inflated with the pressurized air. Such a predicament separates the hide 96 from the underlying muscle tissue 98 and permits easy removal of the feathers 95 without harming the valuable hide 96.

Figure 11:
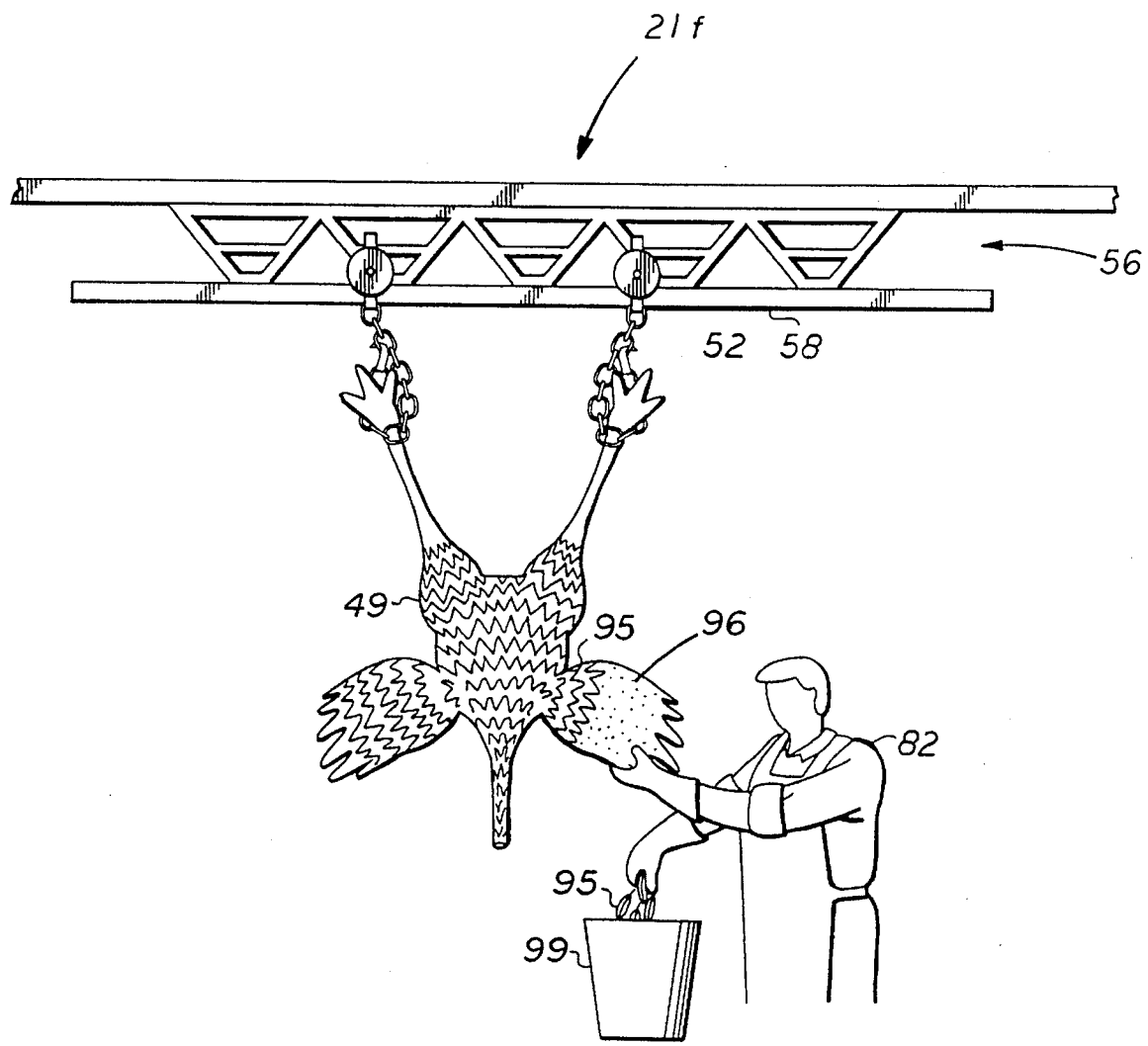
FIG. 11 is a side schematic view of the de-feathering area of FIG. 2 illustrating removal of feathers during the de-feathering procedure.

After the hide 96 has been loosened from the muscle tissue 98, the facility worker 82 removes the feathers 95 from the inverted ratite 49. The feathers 95 may be removed manually by hand or by use of a clipping apparatus and/or vacuum device. Manual removal of feathers 95 is illustrated in FIG. 11. The feathers 95 are placed in a container 98, which is eventually sealed, for transport to another segregated, fully enclosed area of the facility 21 for further processing, packaging, and/or shipment. The feathers 98 are a marketable product in the fashion and cosmetic industries.

Figure 12:
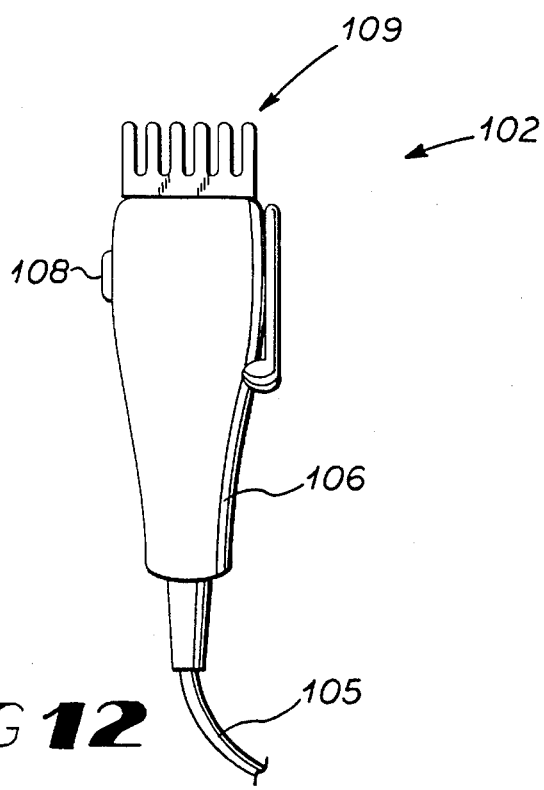
FIG. 12 is a top perspective view of a clipping apparatus which may be used in the de-feathering area of FIG. 2 for cutting feathers.
Figure 13:
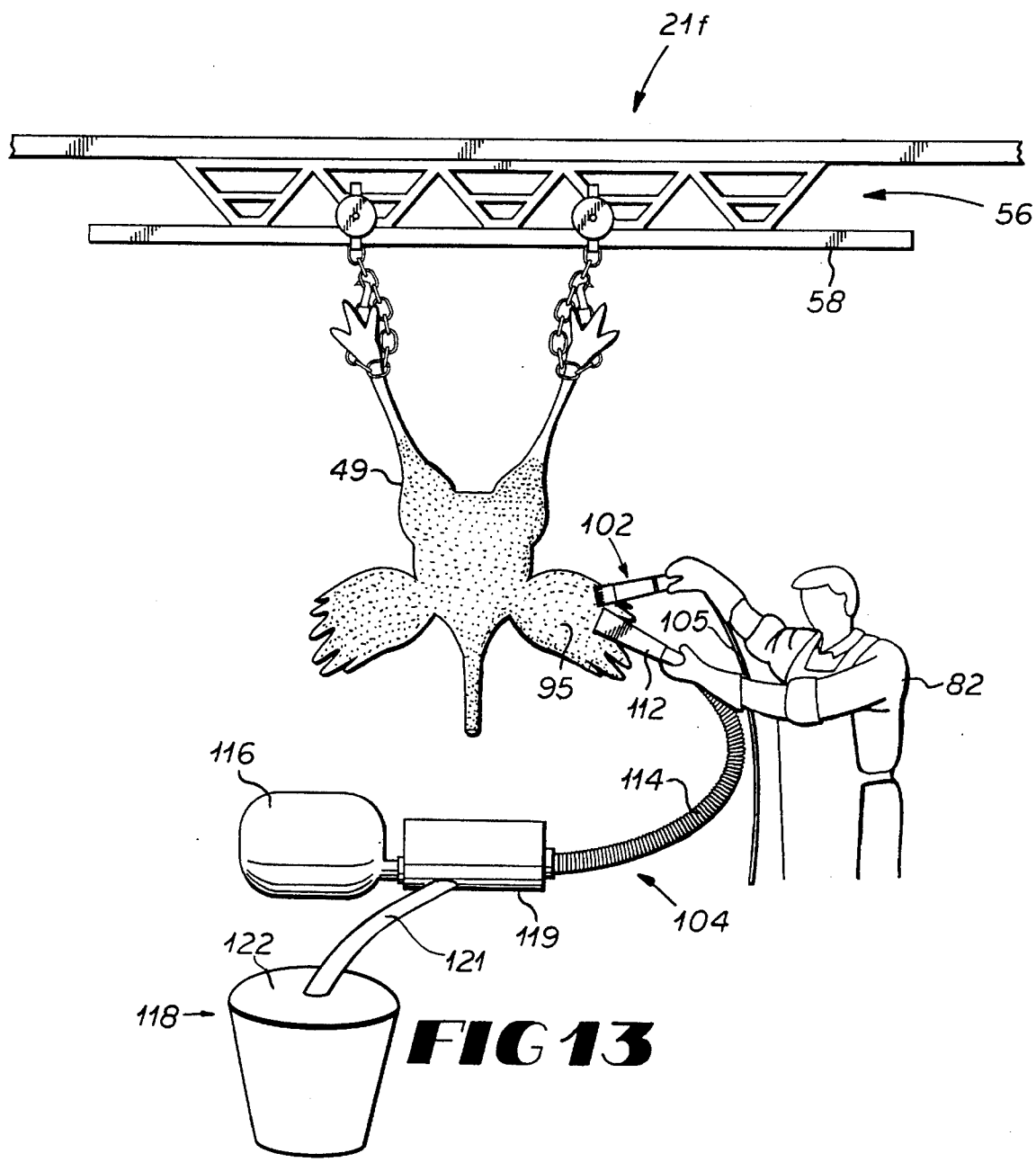
FIG. 13 is a side schematic view of the de-feathering area of FIG. 2 illustrating removal of feathers using a suctioning means in conjunction with the clipping apparatus of FIG. 12.

The feathers 95 may also be removed by using any suitable clipping apparatus 102, preferably as illustrated in FIG. 12, or any suitable vacuum device 104, preferably as illustrated in FIG. 13, or by using a combination of the foregoing. As shown in FIG. 12, the clipping apparatus 102 is an electric hand-held device approximately 8 to 10 inches in length and approximately 3 to 4 inches in diameter. The clipping apparatus 102 has an electric power cord 105 for providing power to the device, a housing 106, an actuation button switch 108 for switching the apparatus 102 to an on or off state, and blade means 109 for cutting the feathers 95 from the hide 96. The blade means 109 comprises about 3 to 6 stationary blades and about 3 to 6 movable blades interposed therebetween. While using the clipping apparatus 102, the apparatus 102 is placed about 1 inch from the surface of hide 96. The apparatus 102 is then activated at which time the feathers 95 are severed from the ratite 49. When feathers 95 are cut, stubs remain behind in the hide 96.

The feathers 95 may also be suctioned from the ratite 49 in conjunction with either manual removal of the feathers 95 or removal using the clipping apparatus 102. Use of a vacuum device 104 is illustrated in FIG. 13. As shown, the vacuum device 104 comprises a large suction head 112 of about 6 to 8 inches in diameter. Attached to the suction head 112 is a hose line 114 of approximately 3 to 6 inches in diameter. The hose line 114 is attached to a compressor 116 which generates a vacuum of about 0 to 50 inches (water) in the hose line 114. A bagging mechanism 118 is connected to the hose line 114 with a suitable interface means 119. A hose line 121 connects the interface means 119 to the removably affixed top 122 of the bagging mechanism 118. The bagging mechanism 118 is lined with a bag which is replaced when full of feathers 95. Moreover, the interface means 119 may include one or more filters for insuring that feathers 95 are not sucked into the compressor 116. Thus, it can be seen from the foregoing structure that feathers 95 which have been clipped or pulled from the ratite 49 are immediately sucked into the vacuum apparatus head 112 through the hose line 114 and then into the bag associated with the bagging mechanism 118.

The ratite 49 is moved on the rail system 56 from the isolated de-feathering area 21f to a vent processing area 21g (FIG. 2) in the facility 21. In the vent processing area 21g, a facility worker holds the ratite 49 with one hand and makes a circular cut around the vent (opening at tail end, including anus) utilizing a straight knife. The facility worker next reaches into the ratite 49 and grasps the colon, urinary track, and reproductive organs with one hand and pulls these organs approximately two to six inches from the ratite 49 in a manner such to prevent cross contamination. A bag is then placed over and around the foregoing organs and synched tight utilizing a string, rubber band, or other constricting device, in order to prevent leakage and cross contamination while ratite 49 undergoes further processing. It can be appreciated by one skilled in the art the that processing the vent and associated organs can typically be performed in a more efficient manner when ratite 49 is suspended from rail system 56 by only one leg 68, whereby the facility worker can separate legs 67, 68 to more easily access the vent region of ratite 49. (Step 20f of FIG. 1)

The ratite 49 is now moved to a leg/wing processing area 21h (FIG. 2). In the leg/wing processing area 21h, a facility worker performs a procedure on each of the legs 67, 68 of the ratite 49. The procedure is illustrated in FIG. 14. First, the facility worker takes one leg, leg 67 for example, and skins the hide 96 from the foot 124 to about the thigh region utilizing a straight knife, thereby exposing the bones 126, 128 in the leg 67 of the ratite 49. The facility worker then removes the foot 124 from the ratite 49 utilizing a straight knife, scissor-like apparatus, or some other suitable cutting device. After removal of the foot 124, the ratite 49 still remains hanging from the rail system 56 via the other shackled leg 68 (not shown). This is important because the ratite 49 will be deemed contaminated if it touches the floor 71 of the facility 21. The foot region is placed in a bin for transport to the rendering area 21r.

The facility worker next acquires a trolley hook 132. As illustrated in the FIG. 14, the trolley hook 132 has an elongated metal hook 134, which measures approximately 12" in vertical length, which is adjoined to a roller mechanism 136 by a chain link 138, or some other attachment mechanism, such as a swivel mechanism. The roller mechanism 136 is designed to ride on the rail 58 of the rail system 56. The metal hook 134 is placed between the connected bones 126, 128 of the leg 67. The roller mechanism 136 of the trolley hook 132 is then placed on the rail system 56 to permit the ratite 49 to be affixed to and moved freely on the rail system 56 for the remainder of the novel procedure. (Step 20g of FIG. 1) The facility worker repeats the foregoing foot-removal procedure on the other leg 68. Consequently, at the end of this procedure, the ratite 49 hangs from two trolley hooks 132, rather than from two shackles 52.

Next, at the leg/wing processing area 21h, the facility worker removes both wings from the ratite 49 utilizing a knife or some other suitable cutting device and places the wings in a bin for transport to the rendering area 236. (Step 20h of FIG. 1)

Figure 15:
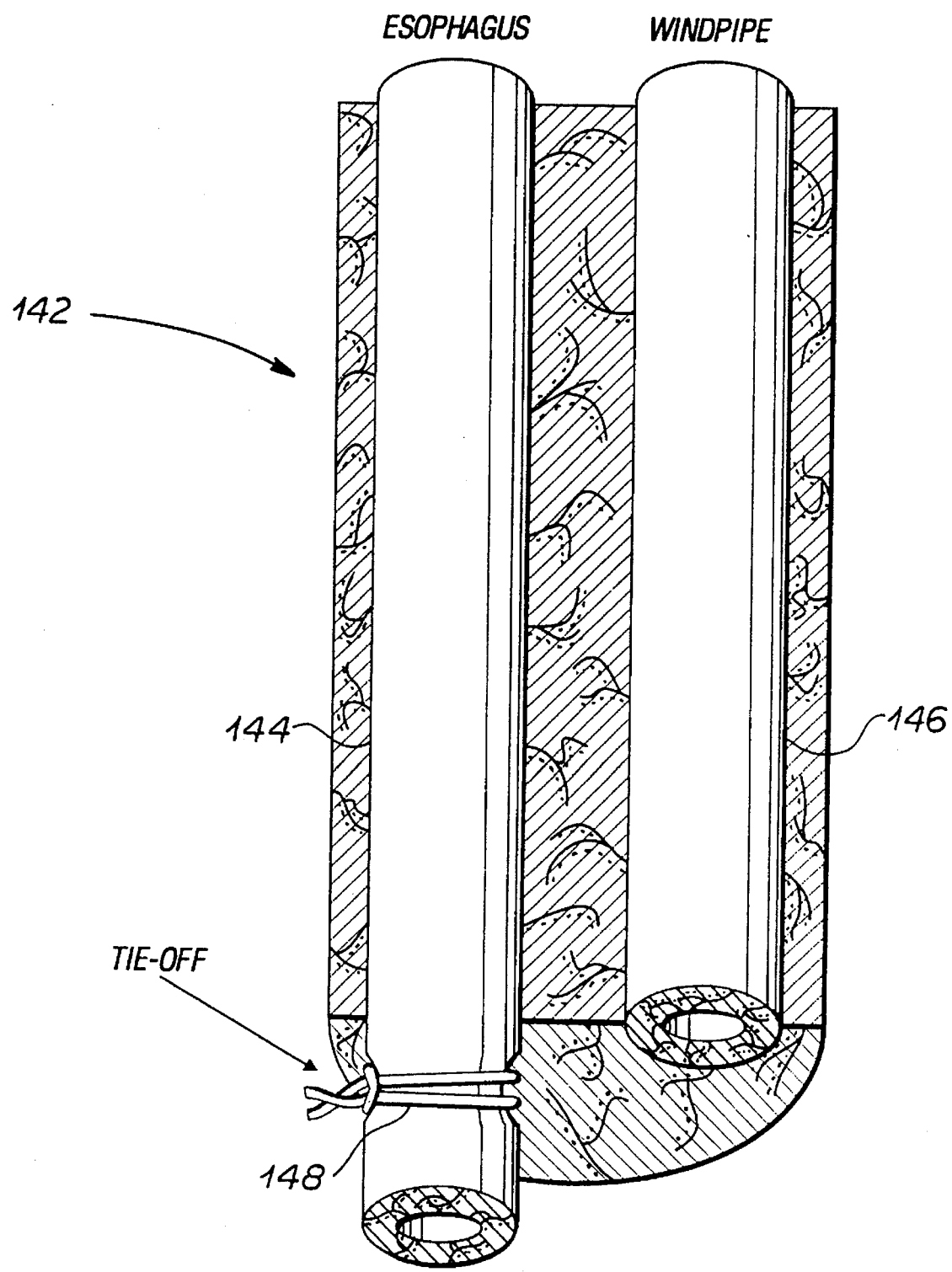
FIG. 15 is a partial cut-away view of the neck region of a ratite wherein the esophagus is tied off in the neck processing area of FIG. 2 to inhibit contamination by fluids therein.

Via the rail system 56, the ratite 49 is transported to a neck processing area 21i (FIG. 2) in the facility 21. In the neck processing area 21i, a facility worker uses a knife to make a vertical cut along the entire length of the neck region to the base of the ratite 49. The length of the laceration varies with the particular dimensions of the ratite 49, but is generally between 12 and 24 inches in length. FIG. 15 shows the neck region 142 after the cut has been made to thereby expose the esophagus 144 and the windpipe 146. The facility worker then strips, or separates, the esophagus 144 and also the windpipe 146 from the muscle tissue in the neck region 142. The esophagus 144 is pulled from the neck region 142 and tied at the end utilizing constricting device 148, for example, a string or rubber band. (Step 20i of FIG. 1) The windpipe 146 is permitted to remain functionally attached to the ratite 49.

After tieing the esophagus 148, the facility worker removes the entire neck region 142 from the ratite 49 using a knife or other suitable cutting device, while permitting the esophagus 144 and windpipe 146 to remain attached to the ratite 49. The neck muscle from the removed neck region 142 is placed by the facility worker upon a separate rack mechanism. The neck muscle is numbered with a correlating U.S.D.A. numbered tag to precisely identify each neck muscle with the corresponding ratite 49. After final U.S.D.A. inspection of the neck muscle, the neck muscle will be transported to the another area for further processing.

Figure 16:
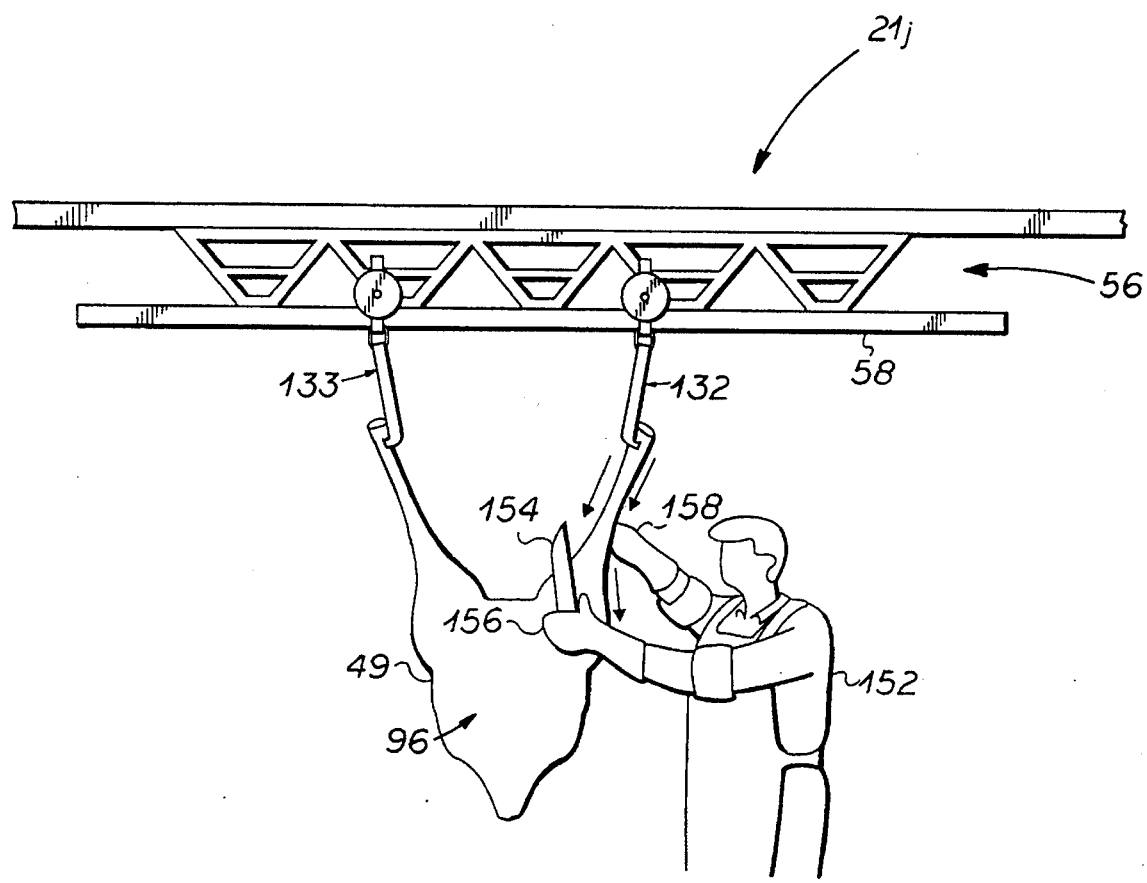
FIG. 16 is a side schematic view of a skinning area of FIG. 2 illustrating a hide skinning procedure.

The ratite 49 is now transported via the rail system 56 to a skinning area 21j (FIG. 2), where careful removal of the valuable hide 96 takes place. (Step 20j of FIG. 1) The skinning procedure is illustrated in FIG. 16. Referring to FIG. 16, a facility worker 152, utilizing a knife means 154, such as a straight knife as shown, a powered skinning knife, or equivalent thereof, skins the flank portions of the shank area (upper leg) and continues downward on the ratite 49 until reaching the bottom, where the neck region originally existed. "Skinning" in the context of this document means to place a knife between the hide 96 and the muscle tissue 98, as shown in FIG. 10, and remove the tissue attaching them in order to free the hide 96 from the skeletal as well as muscular structure. As the facility worker 152 is performing the skinning process with one hand 156, the other hand 158 is utilized to grasp and pull the hide 96 slightly away from the underlying muscle tissue 98.

After sufficiently freeing the hide 96 from the ratite 49, the facility worker 152 pulls the hide 96 from the ratite 49 via mechanical means. A chain or cable is attached to the hide 96 via a clamping mechanism(s) or by wrapping the chain or cable around the hide 96. The chain or cable is then pulled upward or downward manually by hand or with a powered pulling apparatus in order to pull the hide 96 from the ratite 49.

Figure 17:
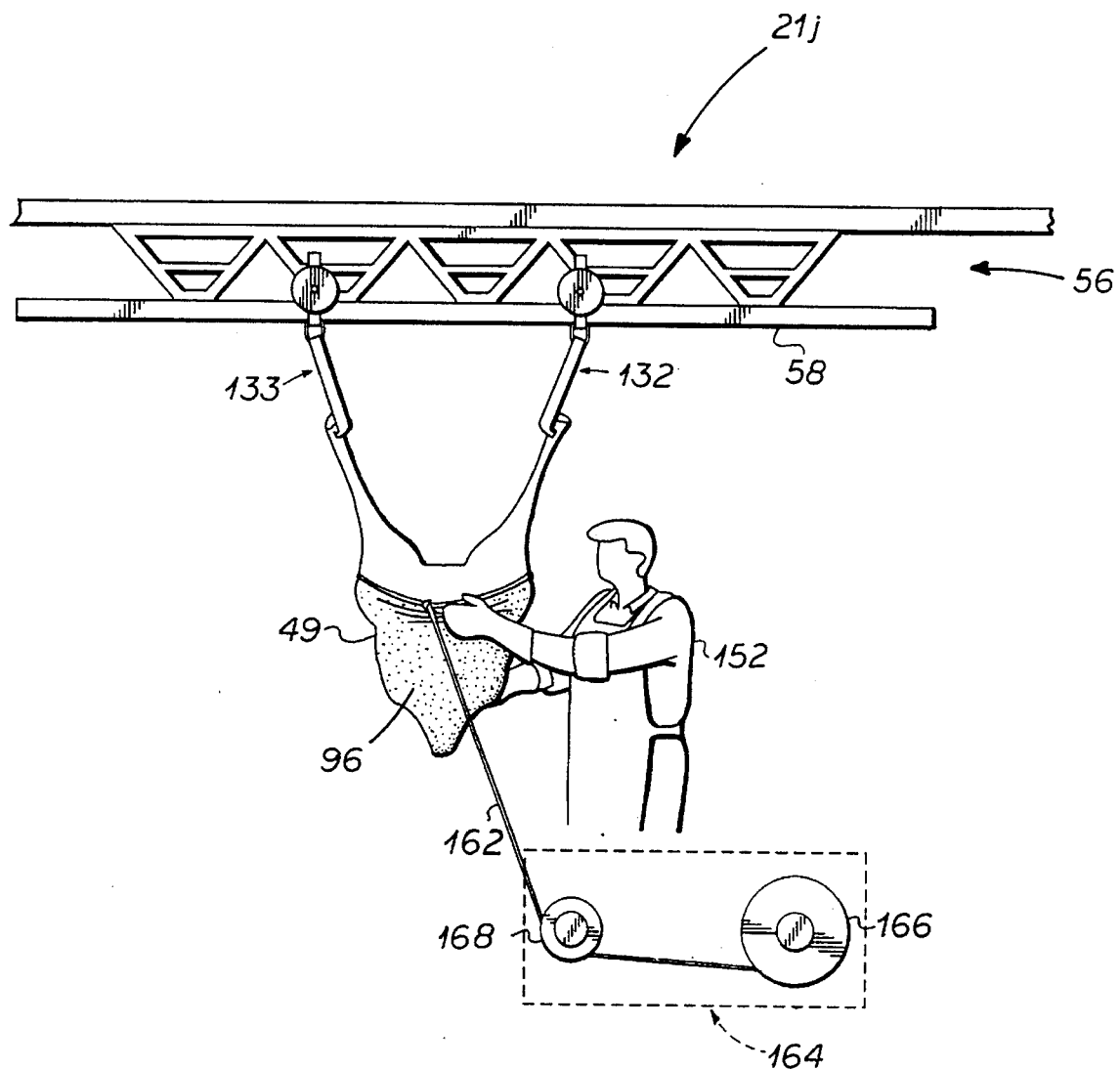
FIG. 17 is a side schematic view of the skinning area of FIGS. 2 and 16 illustrating a procedure for removing the hide from the ratite.

A process for removing the hide 96 is shown in FIG. 17. One end of a cable 162 is wrapped around the freed portion of the hide 96, while the other end of the cable 162 is attached to a pulling apparatus 164 which is used to pull the remaining portion of the hide 96 free from the ratite 49 via a downward motion. The pulling apparatus 164 has a rotatable drive pulley 166 and a rotatable guide pulley 168 for selectively coiling the cable 162 about the drive pulley 166. The drive pulley 166 can be driven by any conventional means, such as a motor, engine, or otherwise. Once the hide 96 is removed, the hide 96 is transported to a separate area of the facility 21 for further processing. In essence, a facility worker spreads each hide 96 on a table exposing the entire dimensions of the hide 96. Excess tissue is removed from the hide 96 by a facility worker, and salt is liberally applied over the entire side of the hide 96 for preservative purposes. The hide 96 is then folded or rolled from the outside in and is tied with a cord or like device. The hides 96 are stacked and shipped in this preserved form for further processing by a subcontracting company.

Figure 21:
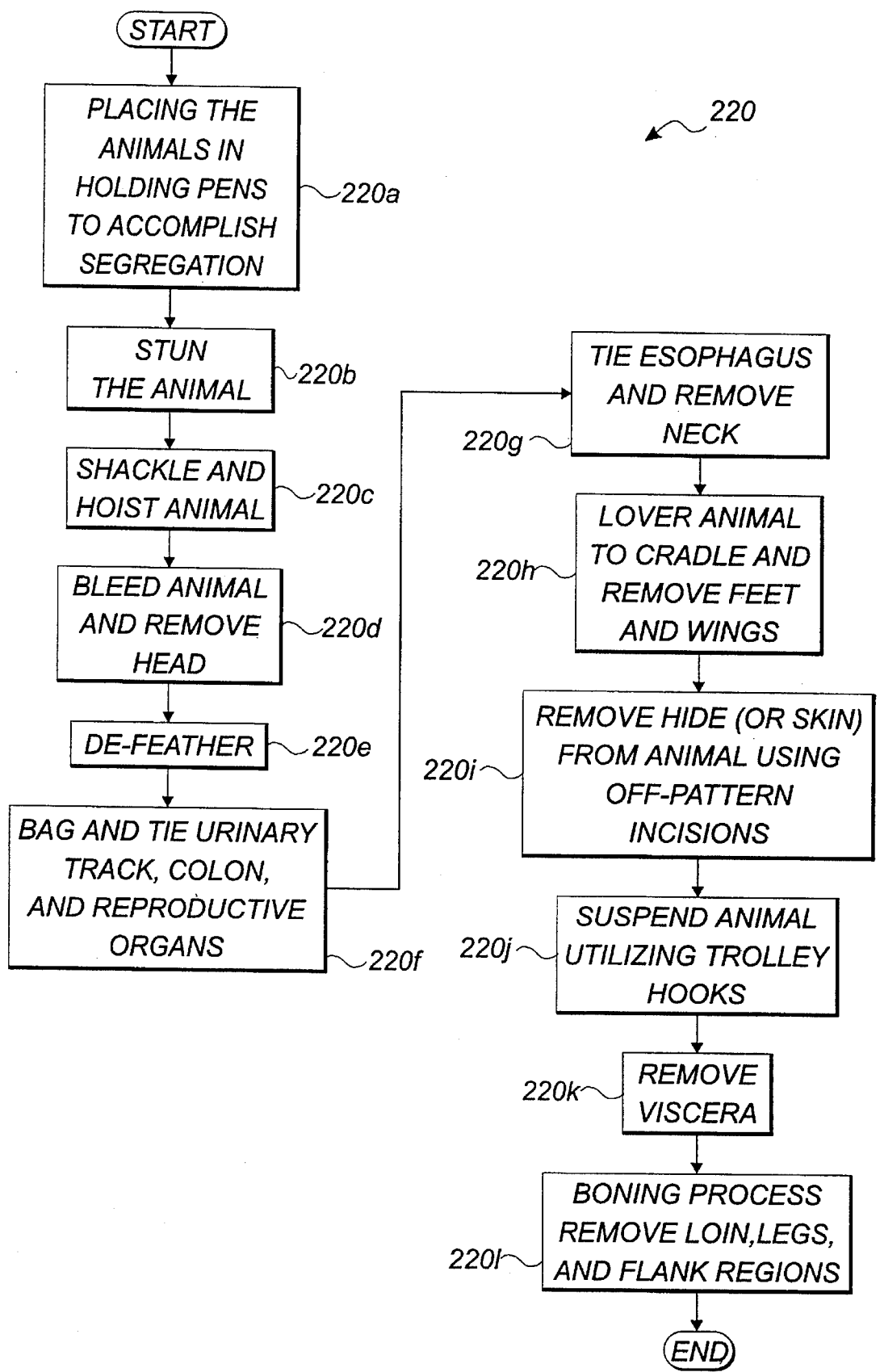
FIG. 21 is a flow chart showing generally a methodology of the present invention which incorporates an alternative method for skinning a ratite.

Another methodology 220 of the present invention which incorporates an alternative method for skinning ratite 49 is illustrated in FIG. 21. The methodology 220 is set forth in a flow chart format, wherein successive steps of the procedure are denoted by reference numerals 220a through 220l. Steps 220a–220f of methodology 220 are substantially identical to steps 20a–20f of methodology 20, illustrated in FIG. 1. Accordingly, the description of steps 20a–20f, as described above, are incorporated herein with regard to steps 220a–220f, respectively, of methodology 220.

Thus, following the step of bagging and tieing the vent and associated organs (Step 220f of FIG. 21, corresponding to Step 20f of FIG. 1), ratite 49 is transported to a neck processing area wherein the esophagus is tied off utilizing a string, rubberband or other constricting device. In addition, the neck region is removed from the ratite 49 using a knife or other suitable cutting device, while permitting the esophagus 144 and windpipe 146 to remain attached to the ratite 49. (Step 220g of FIG. 21) This step is substantially identical to the neck processing performed in Step 20g of methodology 20. Further, this step is interchangeable in processing order with the vent processing of step 220f; however, step 220g should occur prior to step 220h because the neck of ratite 49 may become contaminated by touching facility floor 71 when ratite 49 is lowered onto cradle 230. Hence, methodology 220 incorporates the neck processing step, i.e., step 220g, prior to the step of removing the feet and wings of ratite 49, i.e., step 220h.

Figure 22A:
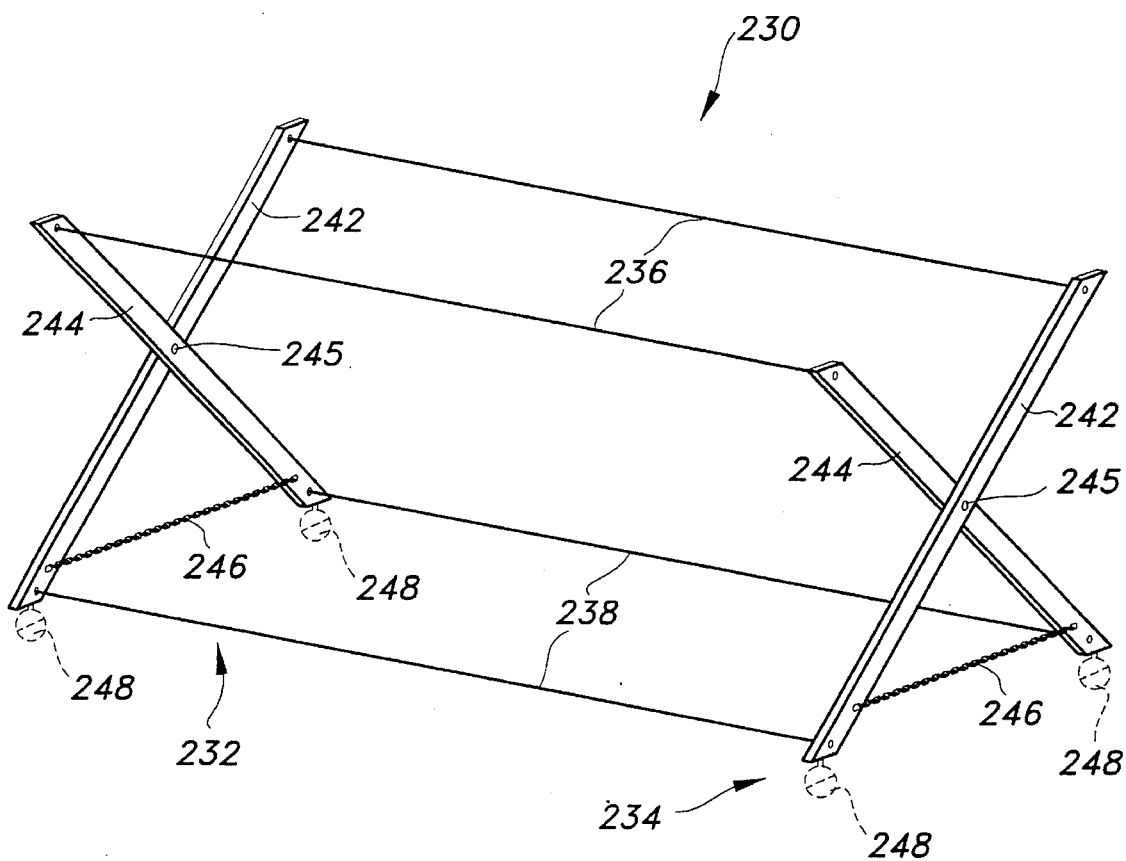
FIG. 22A is a side perspective view of a cradle for holding a ratite in accordance with the methodology of FIG. 21.
Figure 22B:
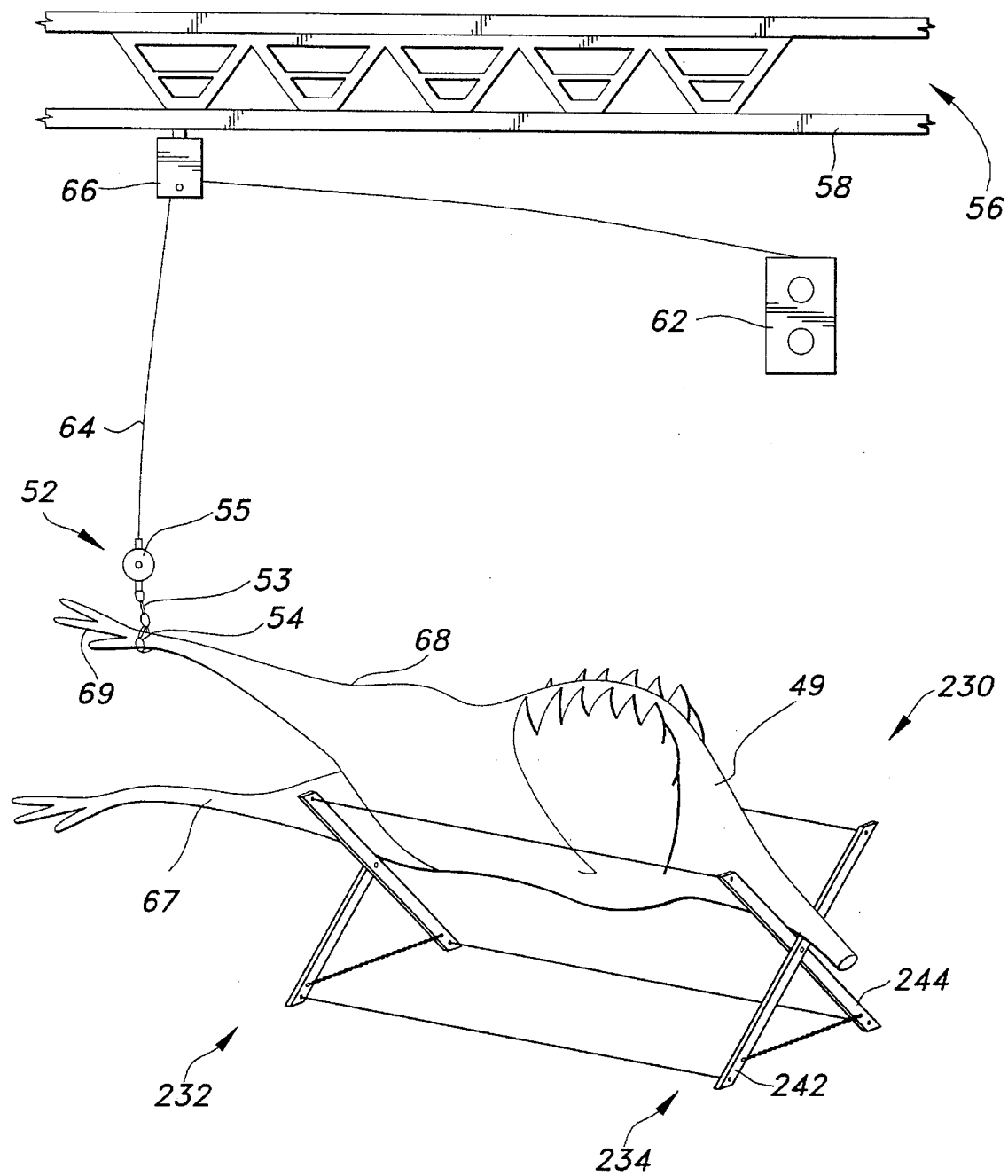
FIG. 22B is a side schematic view of a skinning area in accordance with the methodology of FIG. 21 illustrating a ratite being positioned in the cradle of FIG. 22A.

Once the vent and neck of ratite 49 have been processed, ratite 49 is lowered from rail system 56 onto a cradle 230, illustrated in FIGS. 22a and 22b. The cradle 230 comprises a bed mechanism for holding the ratite 49 in place in a substantially horizontal position while a facility worker removes body parts of ratite 49, and for transporting ratite 49 from one processing area to another. In addition, the cradle 230 is configured to provide the facility worker with access to substantially all surface areas of ratite 49 so as to enable the facility worker to make cuts or incisions anywhere about the circumference of ratite 49 without having to exert substantial effort to contort the body of ratite 49.

In the preferred embodiment, cradle 230 comprises two end pieces 232, 234 connected by elongated crossmembers 236 at the top and crossmembers 238 at the bottom. Crossmembers 236, 238 are preferably made out of a rigid structure such as tubular steel or aluminum. End pieces 232, 234, as illustrated in FIG. 22a, include two crossarms 242, 244 connected together at substantially their central portions by a connecting mechanism 245, such as but not limited to a welded joint, a nut/bolt arrangement, or a rivet. The connection can be made so that crossarms 242, 244 are held in a fixed relationship with respect to one another or in a manner that they can be pivoted with respect to one another. If leg members 242, 244 are pivotally attached, then an adjustment mechanism 246 is provided wherein the amount of pivot between crossarms 242, 244 can be selectively adjusted to accommodate ratites of various sizes. In FIG. 22A, adjustment mechanism 246 is illustrated as a chain of adjustable length affixed to and extending between the lower portions of crossarm 242 and corresponding crossarm 244. In the preferred embodiment, both end pieces 232, 234 have an adjustment mechanism though this is not required for the operation of the present invention. In addition, wheel means 248 (shown in phantom lines) such as caster wheels or other wheel designs as are well known in the art and commercially available, can be mounted to end pieces 232, 234 in order to provide mobility to cradle 230. If cradle 230 is equipped with wheel means, it would be desirable to include a breaking device on cradle 230 which would fix the position of cradle 230 when actuated. This configuration may be preferable in a facility not having a continuous rail system whereby ratite 49 is be removed from one rail system and transported to another rail system from which it will be suspended.

In another embodiment of cradle 230, the end pieces comprise two vertical legs of adjustable length connected by a U-shaped rod, preferable at the tops of the legs. The two end pieces are connected by two crossmembers as described above with the preferred embodiment. This configuration may also incorporate wheel means and a break mechanism as also described above with the preferred embodiment. Thus, it can be appreciated by one skilled in the art that a cradle 230 in accordance with the present invention can take many forms other than that illustrated herein.

Ratite 49 is lowered into position on cradle 230 by the hoist mechanism shown in FIG. 22B, which operates in substantially the same manner as the hoist mechanism illustrated in FIG. 6 and described hereinbefore. Thus, by judiciously actuating driving mechanism 62 of the hoist mechanism, the appropriate amount of cable 64 is uncoiled or released, thereby lowering ratite 49. As ratite 49 is being lowered by the hoist mechanism, a facility worker manually positions the upper body portion of ratite 49 at end piece 234 of cradle 230 so that the upper body portion of ratite 49 rests between the upper portions of crossarms 242, 244, being careful not to allow any part of ratite 49 to become contaminated by touching the facility floor 71. As cable 64 is incrementally released, the remaining portion of the body of the ratite 49 is progressively lowered onto cradle 230 as illustrated in FIG. 22B. Note, however, ratite 49 can be transferred from rail system 56 to cradle 230 in a variety of methods other than that disclosed above. For example, a portion of rail system 56 may be physically lowered in order to bring ratite 49 into contact with cradle 230. As another example, cradle 230 may be lifted up toward rail system 56 so as to bring cradle 230 into contact with suspended ratite 49.

Once positioned on cradle 230, ratite 49 is held in place by crossmembers 236 and crossarms 242, 244 of end piece 232, 234. The configuration of cradle 230 maximizes the amount of surface area of ratite 49 which is accessible by the facility worker for processing. This is particularly relevant in a facility not having a continuous rail system where ratite 49 is placed on a table or surface for further processing because the size and weight of a typical ratite is such that an average person would have difficulty in lifting and turning the ratite in order to uncover a portion of ratite 49 for processing. Further, if cradle 230 is equipped with wheel means, then the ratite 49 can be transported between processing areas of the facility via cradle 230.

The factory worker can now perform any desirable processing procedure on the cradled ratite. As an example, the processing procedure of the preferred embodiment is set forth hereafter.

For purposes of illustrating the preferred embodiment, the foot regions of ratite 49 are removed before the wings though it can be appreciated by one skilled in the art that the wings could just as easily be removed before the foot regions. Accordingly, a procedure to remove the foot regions of ratite 49 is initiated. First, the facility worker takes one leg, leg 67 for example, and skins the hide 96 from the foot 124 to about the thigh region utilizing a straight knife, thereby exposing the bones 126, 128 in the leg 67 of the ratite 49. The facility worker then removes the foot 124 from the ratite 49 utilizing a straight knife, scissor-like apparatus, or some other suitable cutting device. The procedure is then repeated for the other leg. The foot region is placed in a bin for transport to the rendering area 21r.

The factory worker then performs a procedure to remove the wing of ratite 49. As with the removal of foot 124, the facility worker must first skin the hide 96 from around the wing region of ratite 49 prior to removing the wing. The facility worker then removes both wings from ratite 49 utilizing a straight knife or some other suitable cutting device. The severed wings are placed in a bin for transport to the rendering area 21r. (Step 220h of FIG. 21)

Figure 23:
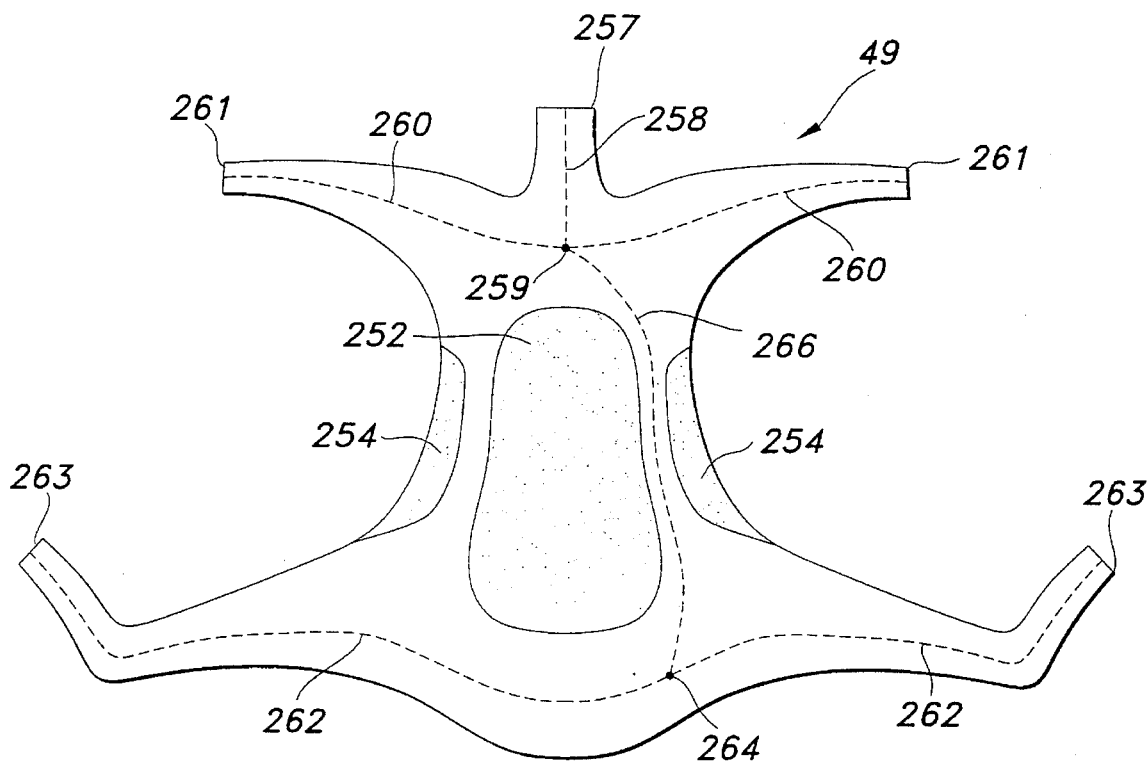
FIG. 23 is a plan view of the front side of a ratite illustrating the cuts made in the hide of a ratite in accordance with the methodology of FIG. 21.

The ratite 49 is now prepared for the skinning procedure performed utilizing off-pattern cuts or incisions whereby the valuable hide is carefully removed while preserving the integrity of the quill patterns 252, 254, as illustrated in FIG. 23. A facility worker, utilizing a knife means, such as a straight knife or another suitable cutting tool, skins ratite 49 by making a plurality of incisions in the skin or hide 96 of ratite 49, substantially following the off-pattern marks illustrated as phantom lines in FIG. 23. This process is enhanced by the configuration of cradle 230 which holds ratite 49 in place and provides access to virtually all of hide 96.

Though the cuts shown in FIG. 23 can be made in any order, it is preferable that the facility worker skin the ratite 49 in progression from the neck region to the vent region. Accordingly, a first cut 258 is made from an upper portion 257 of the neck of the ratite 49 to a position denoted by reference numeral 259. A second cut 260 is made from an end portion 261 of a wing of the ratite 49 to position 259. The cut 260 is repeated for the other wing of ratite 49. A third cut 262 is made from an end portion 263 of a leg of ratite 49 to a position denoted by reference numeral 264. The cut 262 is repeated for the other leg of ratite 49. Lastly, a fourth cut 266 is made from position 259 to position 264, between the belly quill pattern 252 and side quill pattern 254. It is preferred that cut 266 be made so that at least a quarter of an inch of smooth hide remain about either quill pattern 252, 254 so to preserve quill patterns 252, 254 as respective unitary pieces. As facility worker 152 is making the appropriate cut with one hand, the other hand is utilized to grasp and pull the hide 96 away from the underlining muscle tissue 98. This process is assisted through the use of the air injection process utilized above and cradle 230 for holding ratite 49 in place. Typically, to sufficiently free the hide 96 from the ratite 49, the facility worker 152 should pull the hide 96 from the ratite 49 while simultaneously cutting underlying tissue, such as subcutaneous tissue, which may be holding the hide to the ratite carcass. (Step 220i of FIG. 21)

The facility worker next acquires a trolley hook 132 for re-suspending ratite 49 from rail system 56. As illustrated in FIG. 14 and described hereinbefore, an elongated hook 134, which is adjoined to a roller mechanism 136, is placed between connecting bones 126, 128 of the leg 67. The roller mechanism 136 of trolley hook 132 is placed on rail 58 of rail system 56 to permit ratite 49 to be affixed to and moved freely on the rail system 56 for the remaining processing procedures. The facility worker repeats the foregoing hanging procedure on the other leg 68 of ratite 49. (Step 220j of FIG. 21) Consequently, at the end of Step 220j, ratite 49 is hanging from rail system 56 by two trolley hooks 132. However, it can be appreciated that in certain circumstances it may be preferable to only hang ratite 49 by a single leg as previously discussed.

Figure 18:
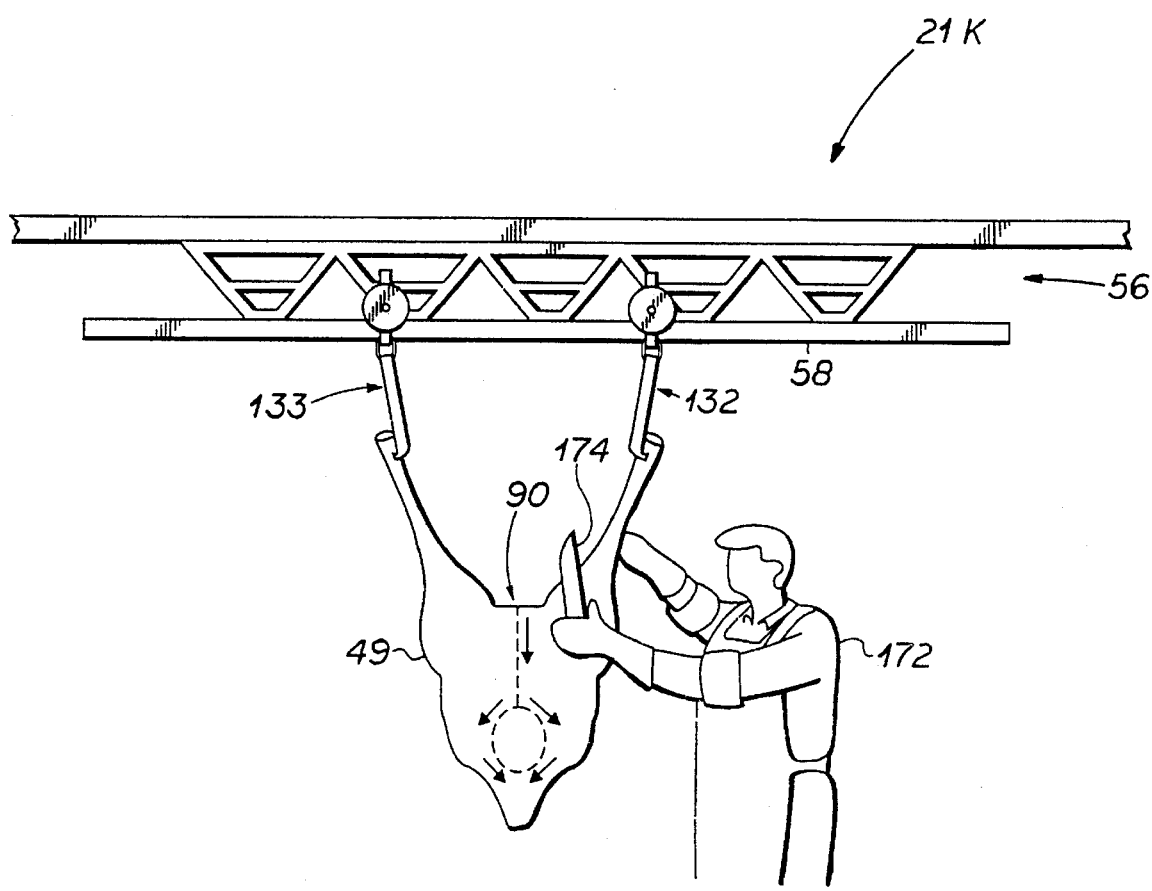
FIG. 18 is a side schematic view of an evisceration area of FIG. 2 illustrating removal of viscera from the ratite.

Once the hide of ratite 49 has been removed in accordance with either methodology 20, 220, ratite 49 is then moved via the rail system 56 to a evisceration area 21k (FIG. 2). At the evisceration area 21k, the viscera of the ratite 49 is removed, as will be described relative to FIG. 18. (Step 20k of FIG. 1) "Viscera" in the context of this document means the internal organs within the abdominal cavity of the ratite 49. Referring to FIG. 18, a facility worker 172 makes a vertical cut with a knife 174 along the entire front of the ratite 49. The cut is made below the ratite membrane (the layer below the skin) from the vent 90 to the breast plate, and then around the breast plate toward the neck region, as shown by arrows in FIG. 18. The cut exposes the viscera and permits easy removal by the facility worker 172.

The facility worker 172 pulls the gizzard from the viscera and ties a string, rubber band, or other similar device around the base of the gizzard. The facility worker 172 next cuts the gizzard from the ratite 49 utilizing a knife. The cut is made above the tie-off point to ensure that no fluids seep from the remaining orifice and contaminate remaining ratite body parts. The gizzard is then removed. The gizzard is opened utilizing a knife and washed and cleaned in accordance with a procedure which is approved by the U.S.D.A. The gizzard is transported to a chilling tank in the product chilling area 21p (FIG. 2) of the facility 21, in order to lower the gizzard temperature and to further clean and prepare the gizzard for transportation. The gizzard is then packaged for shipment in the work-up area 21q.

Furthermore, the facility worker cuts the tissue from around the heart region using the knife 174 and removes the heart from the ratite 49. The heart is opened and is placed in a chilled bath in the product chill room 232 in order to lower the body temperature and clean the heart, and is packaged for shipment in the work-up room 234.

The facility worker also cuts the tissue from around the liver and removes the liver from the ratite 49. Similarly to the gizzard and heart, the liver is opened, chilled, and packaged for shipment.

The remaining viscera, including the intestine area, is freed utilizing a knife and allowed to fall into a bin or other area to permit a complete and thorough inspection by the U.S.D.A. inspector. After inspection, the viscera is transported to the rendering area for further processing.

The ratite 49 is now transported via rail system 56 to a wash area 21l (FIG. 2), where the ratite 49 is washed with water prior to inspection. Next, the ratite 49 is moved to a final inspection area 21m, where a U.S.D.A. inspector conducts a complete and thorough inspection of the ratite 49. If the ratite 49 is approved, then the ratite 49 is transported via the rail system 56 to a hot boning area 21o (FIG. 2). However, if any bruises, fecal material, or other contamination within the specifications set forth by the U.S.D.A. are present on the ratite 49, the U.S.D.A. inspector will reject the ratite 49. In the event of a rejection, the ratite 49 is transported to a trim area 21n (FIG. 2) for removal of the contamination and then is returned to the inspection area 21n for re-inspection. If the ratite 49 is then approved, the ratite 49 continues to the hot boning area 21o. If the ratite 49 is again rejected by the U.S.D.A. inspector for pathological reasons, the ratite 49 and the corresponding neck region are transported to the rendering area 21r for further processing as an inedible product.

Figure 19:
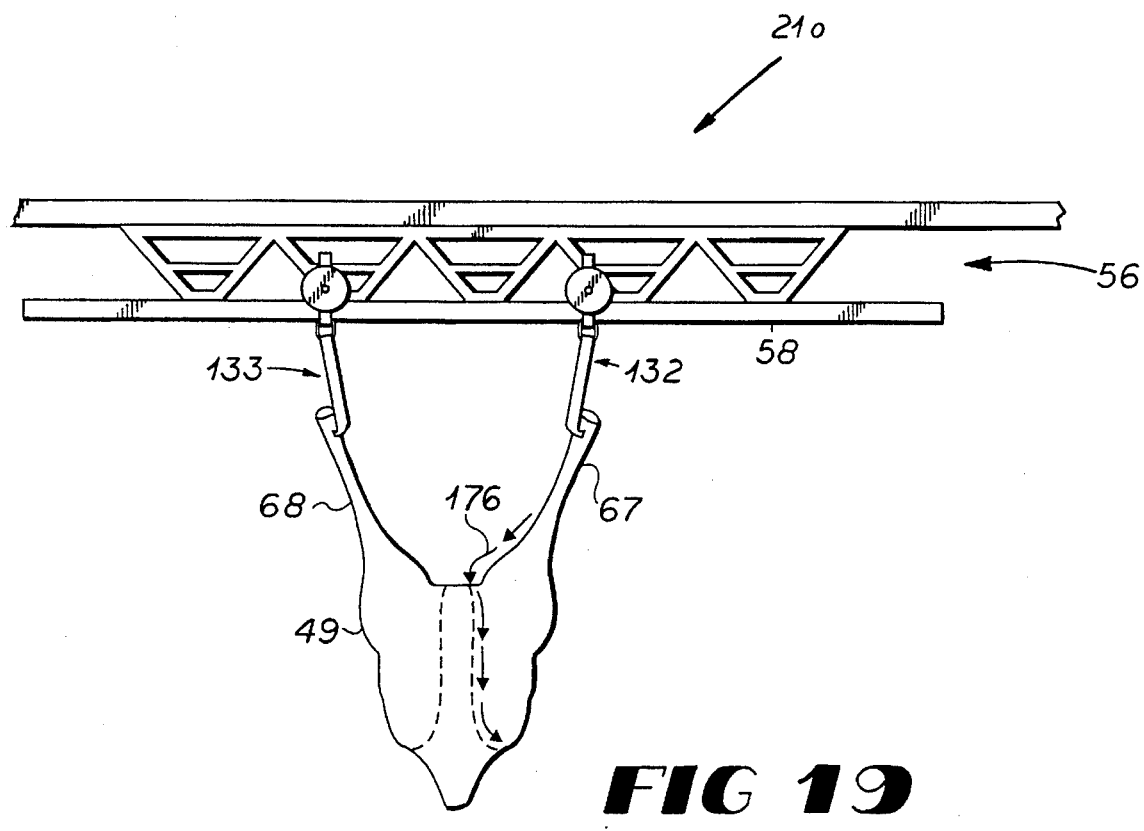
FIG. 19 is a side schematic view of a hot boning area of FIG. 2 illustrating a cut made on the front side of the ratite for removal of the flank, loin, and leg muscles.
Figure 20:
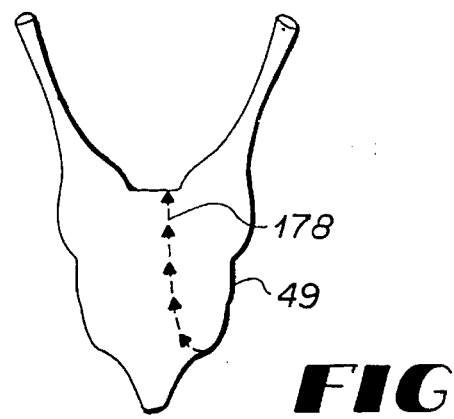
FIG. 20 is a side schematic view of a cut made on the back side of the ratite of FIG. 19 for removal of the flank, loin, and leg muscles.

FIGS. 19 and 20 illustrate a boning process for removing the loin, legs and flank regions of the ratite 49 in the boning area 21o of facility 21. (Step 201 of FIG. 1) This procedure is performed after final inspection by the U.S.D.A. inspector. In essence, the remaining muscle regions are removed from the bone structures of the ratite 49 by either a chilled boning process or a hot boning process in the boning area 21o of facility 21, as will be described in further detail hereinbelow.

The chilled boning process involves the following steps. While the ratite 49 continues to be suspended from the rail system 56 after U.S.D.A. inspection, the muscle groups are transported via the rail system 56 to a product chilling area 21p (FIG. 2) having a chill box in order to reduce the temperature of the ratite for a period of approximately 24 hours. The product chilling area 21p is maintained at a constant temperature about 30 to 45 degrees Fahrenheit, in accordance with U.S.D.A. regulations.

After chilling the ratite 49 for about 24 hours, the ratite 49 attached to the trolley hooks 132, 133 undergoes a dipping or spraying process with water to remove all possible contaminates. Next, a facility worker using a knife, saw, or other suitable cutting means makes a downward vertical cut, as shown by phantom line 176 in FIG. 19, beginning at the top part of the loin region (inside leg) of leg 67 and through the hip joint. The facility worker continues to cut vertically down the ratite 49, and then horizontally across the rib area to free the loin, flank, and leg muscle structures on the front section of the ratite 49.

After completing the front section, the facility worker continues to cut vertically upward on the backside of the ratite 49, as shown by reference numeral 178 in FIG. 20. The cutting on the backside frees the flank, loin, and leg muscles from the back region of the ratite 49. Upon completion of the foregoing cut, the loin, flank, and the leg 67 are completely freed from the ratite 49, but these items remain attached to the rail system 56 via the trolley hook 132. Moreover, the remainder of the ratite 49 is still attached to the other leg 68 and remains suspended from the rail system 56 via the trolley hook 133.

The foregoing procedure is repeated for the other leg 68. Upon completion, the remainder of the ratite 49 is freed completely from the loin sections of both legs 67, 68. The remainder falls into a bin or the like, and is transported to the rendering area 21r for further processing. It should be noted that the foregoing procedure described above and illustrated in FIGS. 19 and 20 may be performed using a saw, such as a band saw, in order to generate two ratite halves from the ratite 49.

If it is desired to remove and preserve the cartilage from the breast plate of the ratite 49, which cartilage has been found to be beneficial in medical research, then the cartilage may be removed using a knife or other cutting means before, during, or after the procedure noted above relative to FIGS. 19 and 20.

The alternative to the chilled boning procedure is the hot boning procedure which involves immediately removing the muscle groups from the ratite 49 just after the killing process. The hot boning process involves the following steps. The ratite 49 is cut as described above relative to FIGS. 19 and 20, which discussion is incorporated herein by reference, without prior chilling of the ratite 49. The muscle groups are then removed from the rail system 56 and placed on a table or conveyer. A facility worker utilizing a straight knife cuts horizontally along the entire length of the leg muscle group, around the remaining skeletal structure, in order to remove the bones from the leg. The muscle groups are then cut, sliced, and trimmed in accordance with the customer specifications and under the careful supervision of the U.S.D.A. Alternatively, the halves of the ratite 49 are placed on a moving conveyor called a boning table. While on the moving conveyor, specific cuts are made to the ratite 49 to remove specific muscular tissues, including the flank and loin sections. The muscular tissues are then trimmed and sent to the packaging area for further processing. Muscular tissue trimmed from the specific piece of product are transported to a separate area for grinding and mixing into a ground meat product.

In the packaging area, the smaller tissue parts remaining attached to the skeletal structure are removed utilizing a wizard knife. Following removal of the muscle tissue from the bone, the tissue is portioned utilizing a unique procedure to provide a final product. The steps to this proportion vary with the product specifications and USDA regulations.

In the ground meat area, trimmed edible products are transported via a conveyor system or by hand to a vat area where the product is checked for contamination and checked for fat and other content. Upon inspection and approval, the product enters a large commercial grinder to be ground into a ground meat product. The ground product is packaged and shipped for transport.

The portion product on the boning table is bagged in an air tight plastic bag or container and placed in a fabricated box for shipment. All necessary USDA labels are affixed to the box and the product. The box is then stored in a temperature controlled area and/or cooled until shipment by truck, rail, etc.

When the product is portioned into a smaller product (e.g., steaks, etc.), the product is moved to the packaging area where the product is placed in a plastic bag. The bag is sealed to make sure that no air is permitted in the bag, and the bag is placed in a shrink tunnel where the bag is heated to shrink the plastic around the product, thus removing the air in the bag and vacuum packaging the product. The product is then placed in a specialized cardboard box and USDA labels affixed to the product and box.

The by-products of the foregoing process which include the viscera, wings, feet, bones and other body parts are transported to the rendering area 21r (FIG. 2). In the rendering area 21r, these by-products are separated into two groups: (1) edible by-products and (2) inedible by-products. The procedures for processing each of the foregoing is substantially the same, but the U.S.D.A. requires separation during processing for sanitation reasons. The by-products are ground in large, conventional grinding apparatuses (not shown). The products are then dried in large drying apparatuses (not shown) to a sufficient temperature to remove excess water/oil and decontaminate the product. Further, the products are then sold as is or are ground into a powder form. As examples of uses for the foregoing substances, the inedible by-products can be used as fertilizers and the edible by-products can be used as dog food. Obviously, there are other substantial edible and inedible commercial uses.

Blood is also processed in the rendering area 21r. The blood is funnelled from the slaughtering/processing areas into a vat(s) which is transported to the rendering area 21r. The blood is dried into a powder using a large drying system. The powder may be used as fertilizer or livestock feed.

It should be further noted that, with respect to ratites 49, such as emu, the glands and oils contained therein may be of research value and/or of significant worth. Accordingly, the glands may be removed and preserved in accordance with the present invention. A variety of glands may be removed throughout the process 20 of FIG. 1. Generally, these glands are severed from the ratite 49 when the glands become exposed and can be easily removed without significant damage thereto. For instance, glands in the neck region of the ratite 49 are removed during or shortly after removal of the neck (step 20i of FIG. 1), as described hereinbefore. Moreover, other glands are removed from the main body of the ratite 49 during or shortly after the hide is removed from the ratite 49 (step 20j of FIG. 1), as previously described. The glands, once removed, are transported to an area of the facility 21 for inspection and packaging.

The foregoing description of the preferred embodiment and of related alternative embodiments thereof has been presented merely for purposes of illustration and description. It is not intended to be exhaustive or to limit the present invention to the precise embodiments disclosed, and obviously many modifications and variations to the embodiments are possible in light of the above teachings. All such modifications and variations are intended to be within the scope of the present invention, as defined by the claims hereafter.

Wherefore, the inventors claim the following:

1. A method for removing hides from ratites without damage to the hide during removal and on a mass scale in a facility having various processing areas, comprising the steps of:

providing an overhead rail system in said facility for permitting movement of said ratites through said facility;

rendering a ratite unconscious;

after rendering said ratite unconscious, suspending said ratite in an inverted position on said rail system;

moving said ratite via said rail system to a defeathering area;

while said ratite is at said de-feathering area, inserting an air dispensing probe into the ratite at various locations;

while inserting said air dispensing probe, injecting air into said ratite between said hide and muscle tissue so that said hide and feathers are separated from said muscle tissue;

after de-feathering said ratite, lowering said ratite from said rail system onto a cradle for holding said ratite; and removing the hide from said ratite by cutting the hide at desirable locations.

2. The method of claim 1, wherein the step of removing the hide is performed by making off-pattern cuts in the hide.

3. The method of claim 1, further including the step of re-suspending said ratite from said rail system after removal of a body part of said ratite, wherein said rail system comprises a first riding rail and a second riding rail, said ratite being initially suspended from said first riding rail, then lowered onto said cradle for removal of a body part, and the re-suspended from said second riding rail.

4. The method of claim 1, further including the step of re-suspending said ratite from said rail system, wherein said rail system comprises a single riding rail.

5. The method of claim 1, further comprising the step of moving said ratite through said facility to various processing area via said cradle.

6. The method of claim 1, wherein said cradle includes wheel means mounted to the bottom of said cradle for making said cradle movable about said facility, said cradle including a brake mechanism for fixing the position of said cradle.

7. The method of claim 1, wherein said cradle is configured to be adjustable so as to accommodate said ratites of various size.

8. The method of claim 1, wherein said cradle comprises two end pieces spaced apart and connected by a plurality of crossmembers, whereby said ratite residing on said cradle is held in place by said end pieces and said crossmembers in a manner so that substantially all body parts of said ratite are accessible for processing.

9. A method for efficiently processing ratites on a mass scale in a facility having various processing areas, comprising the steps of:

providing an overhead rail system in said facility for permitting movement of a ratite through said various processing areas;

constraining said ratite in a generally upright attitude;

rendering said ratite unconscious;

after rendering said ratite unconscious, suspending said ratite in an inverted position on said rail system;

de-feathering said ratite;

lowering said ratite from said rail system onto a cradle for holding said ratite while a body part of said ratite is removed;

removing the hide from said ratite;

removing the viscera from said ratite; and moving said ratite through said various processing areas via said cradle.

10. The method of claim 9, further comprising the step of re-suspending said ratite from said rail system after removal of said body part of said ratite.

11. The method of claim 9, further comprising the step of moving said ratite through said facility to various processing area via said cradle.

\* \* \* \* \*